United States Patent
Oh

(10) Patent No.: US 11,428,273 B2
(45) Date of Patent: Aug. 30, 2022

(54) CONSTANT VELOCITY JOINT WITH CRASH COLLAPSE FEATURE

(71) Applicant: DANA AUTOMOTIVE SYSTEMS GROUP, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 355 days.

(21) Appl. No.: 16/625,159

(22) PCT Filed: Jul. 20, 2018

(86) PCT No.: PCT/US2018/043111
§ 371 (c)(1),
(2) Date: Dec. 20, 2019

(87) PCT Pub. No.: WO2019/018777
PCT Pub. Date: Jan. 24, 2019

(65) Prior Publication Data
US 2021/0341022 A1 Nov. 4, 2021

Related U.S. Application Data

(60) Provisional application No. 62/535,389, filed on Jul. 21, 2017.

(51) Int. Cl.
*F16D 3/227* (2006.01)
*F16D 3/84* (2006.01)
*F16D 3/223* (2011.01)

(52) U.S. Cl.
CPC ............ *F16D 3/227* (2013.01); *F16D 3/845* (2013.01); *F16D 2003/22303* (2013.01); *Y10S 464/906* (2013.01)

(58) Field of Classification Search
CPC ............... F16D 3/227; F16D 3/845; F16D 2003/22303; Y10S 464/906
(Continued)

(56) References Cited

U.S. PATENT DOCUMENTS

| 6,585,601 B2 | 7/2003 | Booker |
| 6,913,105 B2 | 7/2005 | Masuda |

(Continued)

FOREIGN PATENT DOCUMENTS

| DE | 102011014198 | 9/2012 |
| EP | 2105621 | 9/2009 |

(Continued)

OTHER PUBLICATIONS

European Patent Office, International Search Report with Written Opinion issued in Application PCT/US2018/043111, dated Oct. 1, 2018, 11 pages, European Patent Office, Rijswijk Netherlands.

*Primary Examiner* — Greg Binda
(74) *Attorney, Agent, or Firm* — Marshall & Melhorn, LLC

(57) ABSTRACT

A constant velocity joint assembly with a crash collapse feature. The constant velocity joint assembly includes an inner race, an outer race, a cage and one or more torque transfer elements. The inner race is drivingly connected to a first shaft and the outer race is connected to a second shaft. Circumferentially extending along at least a portion of an inner surface of the outer race is one or more outer race torque transfer element grooves. One or more crash collapse features circumferentially extend radially inward from at least a portion of the inner surface of the outer race and are disposed directly adjacent to the one or more outer race torque transfer element grooves in the outer race. The one or more crash collapse features are disposed entirely between (Continued)

the one or more outer race torque transfer element grooves and do not extend axially beyond the grooves.

4 Claims, 9 Drawing Sheets

(58) Field of Classification Search
USPC .......................................................... 464/146
See application file for complete search history.

(56) References Cited

U.S. PATENT DOCUMENTS

| | | |
|---|---|---|
| 7,040,991 B2 | 5/2006 | Kuczera |
| 7,717,796 B2 | 5/2010 | Hirakawa |
| 7,972,218 B2 | 7/2011 | Disser |
| 8,157,658 B2 | 4/2012 | Langer |
| 8,187,108 B2 | 5/2012 | Lobel |
| 9,611,897 B2 * | 4/2017 | Edwards ................. F16D 3/223 |
| 2005/0197192 A1 * | 9/2005 | Komai ................... B60K 17/24 |
| | | 464/146 |
| 2008/0153607 A1 | 6/2008 | Frost |

FOREIGN PATENT DOCUMENTS

| | | |
|---|---|---|
| JP | 2009174640 | 8/2009 |
| JP | 2011252547 | 12/2011 |
| WO | 2005057035 | 6/2005 |
| WO | 2014114285 | 7/2014 |

* cited by examiner

CONSTANT VELOCITY JOINT WITH CRASH COLLAPSE FEATURE

CROSS-REFERENCE TO RELATED APPLICATIONS

This application is the National Stage of International Application No. PCT/US2018/043111, filed Jul. 20, 2018, which claims the benefit of U.S. Provisional Patent Application No. 62/535,389 filed on Jul. 21, 2017, which is incorporated herein by reference in its entirety.

FIELD OF THE DISCLOSURE

The present disclosure relates to a constant velocity joint having a crash collapse feature for use in a vehicle.

BACKGROUND OF THE DISCLOSURE

Many vehicles utilize one or more propeller shaft assemblies to transfer the rotational energy generated by a motor of a vehicle to one or more axle assemblies of the vehicle. It is well known within the industry to use one or more propeller shaft assemblies to transmit the rotational of the motor to the one or more axle assemblies of the vehicle when the distance between the axle assemblies or the distance between the motor and the axle assemblies is relatively large. In order to transmit the torque from one shaft to another, the propeller shaft assemblies incorporate the use of one or more constant velocity joints or universal joint assemblies. The constant velocity joints or universal joints allow one shaft to transmit torque to another shaft when the shafts are non-coaxial or at least one of the shafts have a variable angle when in operation.

The problem with many conventional propeller shaft assemblies is that when the vehicle experiences a crash condition, the propeller shaft(s) buckle and penetrate the passenger compartment of the vehicle injuring the passenger(s). Additionally, as a result of the force(s) transmitted through the propeller shaft assembly during the crash, the propeller shaft(s) tend to cause damage to other vehicle components that are in close proximity to or are connected to the propeller shaft assembly. It would therefore be advantageous to develop create a safer propeller shaft assembly wherein the one or more of the constant velocity joints of the propeller shaft assemblies are capable of absorbing at least a portion of the force(s) generates during the crash without injuring the passengers, buckling and/or damaging nearby vehicle components. Additionally, it would be advantageous to develop a constant velocity joint assembly that includes a customizable crash collapse feature.

SUMMARY OF THE DISCLOSURE

A constant velocity joint assembly with a crash collapse feature. The constant velocity joint assembly includes an inner race, an outer race, a cage and one or more torque transfer elements. The inner race is drivingly connected to a first shaft and the outer race is connected to a second shaft. Circumferentially extending along at least a portion of an inner surface of the outer race is one or more outer race torque transfer element grooves. One or more crash collapse features circumferentially extend radially inward from at least a portion of the inner surface of the outer race and are disposed directly adjacent to the one or more outer race torque transfer element grooves in the outer race. The one or more crash collapse features of the constant velocity joint are disposed entirely between the one or more outer race torque transfer element grooves and do not extend axially beyond the one or more outer race torque transfer element grooves.

According to the previous aspect of the disclosure, the one or more crash collapse features of the constant velocity joint assembly may include a substantially cylindrical portion.

According to any one of the previous aspects of the disclosure, the substantially cylindrical portion of the one or more crash collapse features may have a diameter that is less than an innermost diameter of the one or more torque transfer element grooves. Additionally, the substantially cylindrical portion of the one or more crash collapse features may have a diameter that is less than an outermost diameter of the cage of the constant velocity joint assembly.

According to any one of the previous aspects of the disclosure, the substantially cylindrical portion of the one or more crash collapse features may have a length of approximately 1 mm to approximately 25 mm.

According to any one of the previous aspects of the disclosure, the one or more crash collapse features may have a ratio of an outermost diameter of the cage/a diameter of the substantially cylindrical portion of the one or more crash collapse features that is from approximately 1.0002 to approximately 1.5.

According to any one of the previous aspects of the disclosure, the one or more crash collapse features may have a ratio of a length of the substantially cylindrical portion/a diameter of the substantially cylindrical portion of the one or more crash collapse features that is from approximately 0.002 to approximately 0.5.

According to any one of the previous aspects of the disclosure, where upon the occurrence of a crash condition, the one or more crash collapse features collapse the cage of the constant velocity joint radially inward allowing the first shaft to translate axially into at least a portion of the second shaft.

According to any one of the previous aspects of the disclosure, where the one or more crash collapse features may further include a chamfer portion that connects the substantially cylindrical portion of the crash collapse feature to the inner surface of the outer race of the constant velocity joint assembly.

According to any one of the previous aspects of the disclosure, where the angle of the chamfer portion may be from approximately 1° to approximately 30°.

According to any one of the previous aspects of the disclosure, upon the occurrence of a crash condition the cage of the constant velocity joint assembly may be driven into direct with the chamfer portion of the one or more crash collapse features thereby collapsing the cage radially inward allowing the first shaft to translate axially into at least a portion of the second shaft.

According to any one of the previous aspects of the disclosure, the said one or more crash collapse features may further include a radiused portion that connects the substantially cylindrical portion of the one or more crash collapse features to the inner surface of the outer race of the constant velocity joint assembly.

According to any one of the previous aspects of the disclosure, the radiused portion may have a radius that is approximately one half of said innermost diameter of the one or more outer race torque transfer element grooves.

According to any one of the previous aspects of the disclosure, upon the occurrence of a crash condition, the cage of the constant velocity joint may be driven into direct with the radiused portion of the one or more crash collapse features thereby collapsing the cage radially inward allowing the first shaft to translate axially into at least a portion of the second shaft.

According to any one of the previous aspects of the disclosure, the constant velocity joint assembly may further include a flexible boot and a boot can. At least a portion of a first end portion of the boot can may be connected to the outer race of the constant velocity joint assembly and at least a portion of a second end portion of the boot can may be connected to at least a portion of a first end portion of the flexible boot. Additionally, at least a portion of a second end portion of the flexible boot may be connected to at least a portion of the first shaft. An amount of force needed to translate the first shaft into the second shaft may be dependent on an ultimate tensile strength of the flexible boot, an amount of clamping force exerted onto the flexible boot by the second end portion of said the can and an amount of force needed to collapse the cage of the constant velocity joint assembly.

According to any one of the previous aspects of the disclosure, upon the occurrence of a crash condition, the cage of the constant velocity joint assembly may be driven into direct contact with the one or more crash collapse features. Once in contact with the one or more crash collapse features, the cage may apply an amount of force onto the one or more crash collapse features needed to separate the one or more crash collapse features from the outer race thereby allowing the first shaft to translate axially into at least a portion of the second shaft.

According to any one of the previous aspects of the disclosure, the constant velocity joint assembly may further include a flexible boot and a boot can. At least a portion of a first end portion of the boot can may be connected to the outer race of the constant velocity joint assembly and at least a portion of a second end portion of the boot can may be connected to at least a portion of a first end portion of the flexible boot. Additionally, at least a portion of a second end portion of the flexible boot may be connected to at least a portion of the first shaft. An amount of force needed to translate the first shaft into the second shaft may be dependent on an ultimate tensile strength of the flexible boot, an amount of clamping force exerted onto the flexible boot by the second end portion of said the can and an amount of force needed to separate the one or more crash collapse features from the outer race of the constant velocity joint assembly.

According to any one of the previous aspects of the disclosure, the constant velocity joint assembly may further include a plug member that is connected to at least a portion of the inner surface of the outer race. The plug member may include a first substantially horizontal portion, a second substantially horizontal portion and a radially inward extending portion that connects the first substantially horizontal portion to the second substantially horizontal portion of the plug member. The radially inward extending portion of the plug member may include an axially extending portion that extends outward away from the radially inward extending portion of the plug member. The axially extending portion of the plug member may be of a size and shape needed to prevent the first shaft, the inner race, the cage, the one or more torque transfer elements and/or the crash collapse feature from translating axially into the second shaft beyond a pre-determine amount.

According to any one of the previous aspects of the disclosure, the constant velocity joint assembly may be a double offset constant velocity joint or a cross-groove constant velocity joint.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the constant velocity joint assembly disclosed herein may be used in automotive, off-road vehicle, all-terrain vehicle, construction, structural, marine, aerospace, locomotive, military, machinery, robotic and/or consumer product applications. Additionally, as a non-limiting example, the constant velocity joint assembly disclosed herein may also be used in passenger vehicle, electric vehicle, hybrid vehicle, commercial vehicle, autonomous vehicles, semi-autonomous vehicles and/or heavy vehicle applications.

Figure 1:
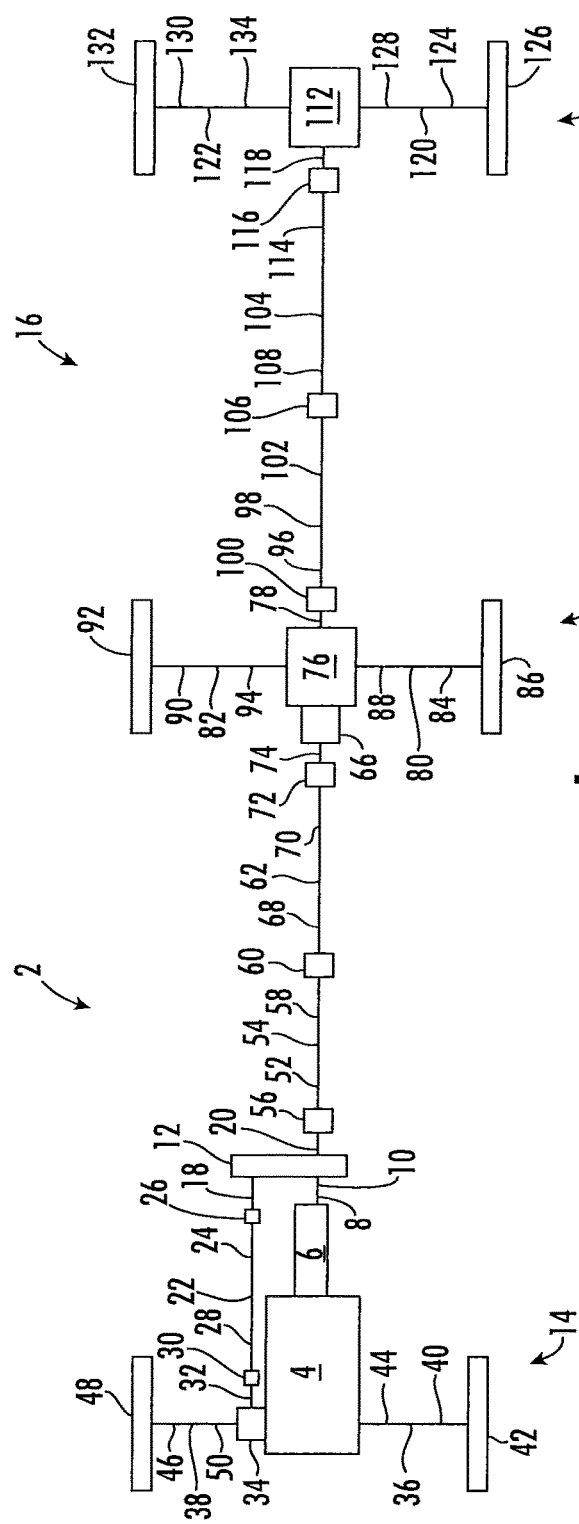
FIG. 1 is a schematic top-plan view of a vehicle having one or more constant velocity joint assemblies according to an embodiment of the disclosure.

FIG. 1 is a schematic top-plan view of a vehicle 2 having one or more constant velocity joint assemblies according to an embodiment of the disclosure. The vehicle 2 has an engine 4 which is drivingly connected to a transmission 6. A transmission output shaft 8 is then drivingly connected to an end of the transmission 6 opposite the engine 4. The transmission 6 is a power management system which provides controlled application of the rotational energy generated by the engine 4 by means of a gearbox.

The transmission output shaft 8 is drivingly connected to a transfer case input shaft 10 which in turn is drivingly connected to a transfer case 12. The transfer case 12 is used to transfer the rotational power from the transmission 6 to a front axle system 14 and a tandem axle system 16 by utilizing a series of gears and drive shafts. The transfer case 12 includes a first transfer case output 18 shaft and a second transfer case output shaft 20.

A first drive shaft 22 extends from the first transfer case output shaft 18 to the front axle system 14 of the vehicle 2. A first end portion 24 of the first drive shaft 22 is drivingly connected to an end of the first transfer case output shaft 18 opposite the transfer case 12 via a first coupling assembly 26. As a non-limiting example, the first coupling assembly 26 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. A second end portion 28 of the first drive shaft 22 is drivingly connected to a second coupling assembly 30. As a non-limiting example, the second coupling assembly 30 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 30 is an end of a front axle system input shaft 32. As a non-limiting example, the front axle system input shaft 32 is a front axle differential input shaft, a coupling shaft, stub shaft or a front axle differential pinion shaft. Drivingly connected to an end of the front axle system input shaft 32 opposite the first drive shaft 22 is a front axle differential 34. The front axle differential 34 is a set of gears that allows the outer drive wheel(s) of the wheeled vehicle to rotate at a faster rate that the inner drive wheel(s). The rotational power is transmitted through the front axle system 14 as described in more detail below.

The front axle system 14 further includes a first front axle half shaft 36 and a second front axle half shaft 38. The first front axle half shaft 36 extends substantially perpendicular to the front axle system input shaft 32. A first end portion 40 of the first front axle half shaft 36 is drivingly connected to a first front axle wheel assembly 42 and a second end portion 44 of the first front axle half shaft 36 is drivingly connected to an end of the front axle differential 34. As a non-limiting example, the second end portion 44 of the first front axle half shaft 36 is drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 32 is the second front axle half shaft 38. A first end portion 46 of the second front axle half shaft 38 is drivingly connected to a second front axle wheel assembly 48. A second end portion 50 of the second front axle half shaft 38 is drivingly connected to an end of the front axle differential 34 opposite the first front axle half shaft 36. As a non-limiting example, the second end portion 50 of the second front axle half shaft 38 is drivingly connected to a front axle differential side gear, a separate stub shaft, a separate coupling shaft, a second front axle differential output shaft and/or a shaft that is formed as part of a front axle differential side gear.

An end of the second transfer case output shaft 20 is drivingly connected to an end of the transfer case 12 opposite the transfer case input shaft 10. As illustrated in FIG. 1 of the disclosure, a first end portion 52 of a second drive shaft 54 is drivingly connected to an end of the second transfer case output shaft 20 opposite the transfer case 12 via a third coupling assembly 56. As non-limiting example, the third coupling assembly 56 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

A second end portion 58 of the second drive shaft 54 is drivingly connected to a fourth coupling assembly 60. As a non-limiting example, the fourth coupling assembly 60 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fourth coupling assembly 60, opposite the second drive shaft 54, is a third drive shaft 62. The third drive shaft 62 drivingly connects the transfer case 12 to a forward tandem axle system 64 of the tandem axle system 16 having an inter-axle differential 66. As illustrated in FIG. 1 of the disclosure, a first end portion 68 of the third drive shaft 62 is drivingly connected to an end of the fourth coupling assembly 60 opposite the second drive shaft 54. A second end portion 70 of the third drive shaft 62 is drivingly connected to an end of a fifth coupling assembly 72. As a non-limiting example, the fifth coupling assembly 72 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fifth coupling assembly 72, opposite the third drive shaft 62, is an end of a forward tandem axle system input shaft 74. An end of the forward tandem axle system input shaft 74, opposite the third drive shaft 62, is drivingly connected to the inter-axle differential 66 of the forward tandem axle system 64. As a non-limiting example, the forward tandem axle system input shaft 74 is an inter-axle differential input shaft, a coupling shaft, stub shaft or an inter-axle differential pinion shaft. The inter-axle differential 66 is a device that divides the rotational power generated by the engine 4 between the axles in a vehicle 2. The rotational power is transmitted through the forward tandem axle system 64 as described in more detail below.

As illustrated in FIG. 1 of the disclosure, the inter-axle differential 66 is drivingly connected to a forward tandem axle differential 76 and a forward tandem axle system output shaft 78. The forward tandem axle differential 76 is a set of gears that allows the outer drive wheel(s) of a wheeled vehicle to rotate at a faster rate than the inner drive wheel(s).

The forward tandem axle system 64 further includes a first forward tandem axle half shaft 80 and a second forward tandem axle half shaft 82. The first forward tandem axle half shaft 80 extends substantially perpendicular to the forward tandem axle system input shaft 74. A first end portion 84 of the first forward tandem axle half shaft 80 is drivingly connected to a first forward tandem axle wheel assembly 86 and a second end portion 88 of the first forward tandem axle half shaft 80 is drivingly connected to an end of the forward tandem axle differential 76. As a non-limiting example, the second end portion 88 of the first forward tandem axle half shaft 80 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 74 is the second forward tandem axle half shaft 82. A first end portion 90 of the second forward tandem axle half shaft 82 is drivingly connected to a second forward tandem axle wheel assembly 92. A second end portion 94 of the second forward tandem axle half shaft 82 is drivingly connected to an end of the forward tandem axle differential 76 opposite the first forward tandem axle half shaft 80. As a non-limiting example, the second end portion 94 of the second forward tandem axle half shaft 82 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 78 is drivingly connected to a side of the inter-axle differential 66 opposite the third drive shaft 62. An end of the forward tandem axle system output shaft 78, opposite the inter-axle differential 66, is drivingly connected to a first end portion 96 of a four drive shaft 98 via a sixth coupling assembly 100. As a non-limiting example, the sixth coupling assembly 100 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

A second end portion 102 of the fourth drive shaft 98 is drivingly connected to a fifth drive shaft 104 via a seventh coupling assembly 106. As a non-limiting example, the seventh coupling assembly 106 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 1 of the disclosure, a first end portion 108 of the fifth drive shaft 104 is drivingly connected to an end of the seventh coupling assembly 106. The fifth drive shaft 104 drivingly connects the inter-axle differential 66 to a rear tandem axle system 110 having a rear tandem axle differential 112. A second end portion 114 of the fifth drive shaft 104 is drivingly connected to an end of an eighth coupling assembly 116. As a non-limiting example, the eighth coupling assembly 116 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the eighth coupling assembly 116, opposite the fifth drive shaft 104, is an end of a rear tandem axle system input shaft 118. As a non-limiting example, the rear tandem axle input shaft 118 is a rear tandem axle differential input shaft, a coupling shaft, stub shaft or a rear tandem axle differential pinion shaft. Drivingly connected to an end of the rear tandem axle input shaft 118, opposite the fifth drive shaft 104, is the rear tandem axle differential 112. The rear tandem axle differential 112 is a set of gears that allows the outer drive wheel(s) of the wheeled vehicle to rotate at a faster rate that the inner drive wheel(s). The rotational power is transmitted through the rear tandem axle system 110 as described in more detail below.

The rear tandem axle system 110 further includes a first rear tandem axle half shaft 120 and a second rear tandem axle half shaft 122. The first rear tandem axle half shaft 120 extends substantially perpendicular to the rear tandem axle system input shaft 118. A first end portion 124 of the first rear tandem axle half shaft 120 is drivingly connected to a first rear tandem axle wheel assembly 126 and a second end portion 128 of the first rear tandem axle half shaft 120 is drivingly connected to an end of the rear tandem axle differential 112. As a non-limiting example, the second end portion 128 of the first rear tandem axle half shaft 120 is drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 118 is the second forward tandem axle half shaft 122. A first end portion 130 of the second rear tandem axle half shaft 122 is drivingly connected to a second rear tandem axle wheel assembly 132. A second end portion 134 of the second rear tandem axle half shaft 122 is drivingly connected to an end of the rear tandem axle differential 122 opposite the first rear tandem axle half shaft 120. As a non-limiting example, the second end portion 134 of the second rear tandem axle half shaft 122 is drivingly connected to a rear tandem axle differential side gear, a separate stub shaft, a separate coupling shaft, a second rear tandem axle differential output shaft and/or a shaft that is formed as part of a rear tandem axle differential side gear.

It is within the scope of this disclosure that one or more of the coupling assemblies 26, 30, 56, 60, 72, 100, 106 and 116 may be a constant velocity joint assembly according to an embodiment of the disclosure.

Figure 2:
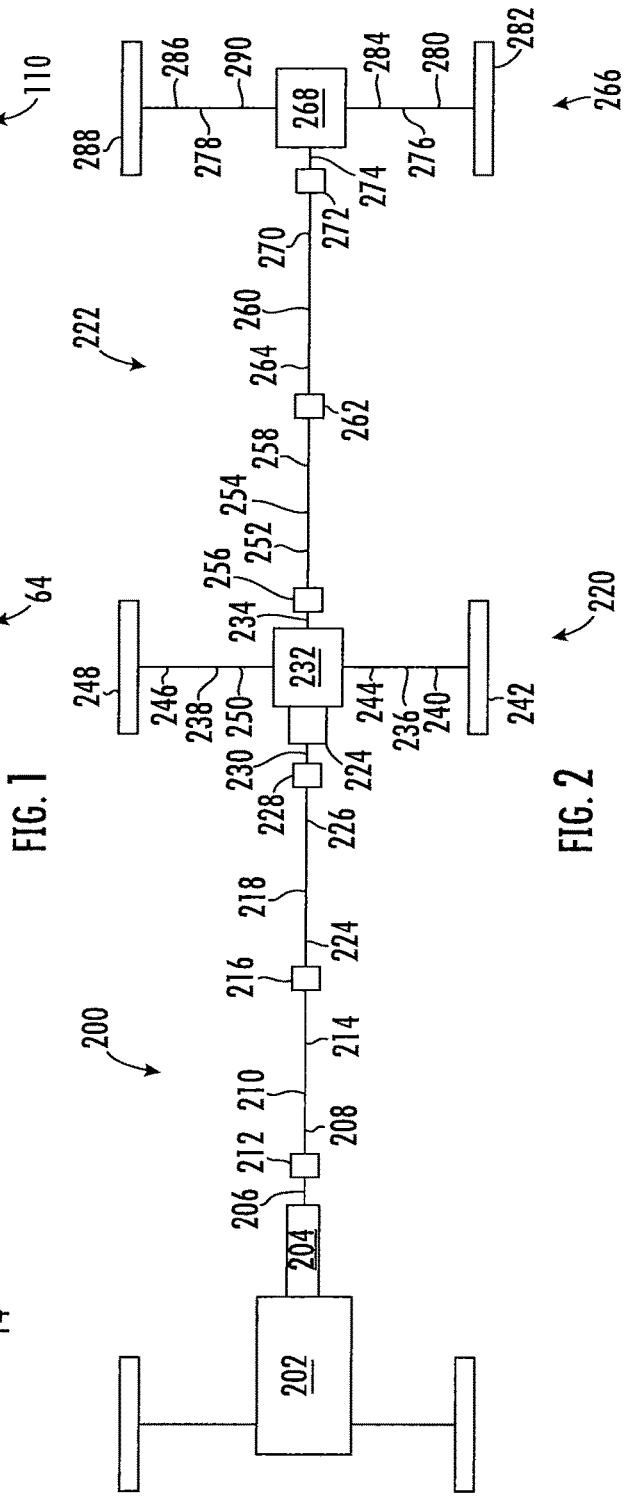
FIG. 2 is a schematic top-plan view of another vehicle having one or more constant velocity joint assemblies according to an embodiment of the disclosure.

FIG. 2 is a schematic top-plan view of another vehicle 200 having one or more constant velocity joint assemblies according to an embodiment of the disclosure. The vehicle 200 has an engine 202 which is drivingly connected to a transmission 204. A transmission output shaft 206 is drivingly connected to an end of the transmission 204 opposite the engine 202. The transmission 204 is a power management system which provides controlled application of the rotational power generated by the engine by means of a gear box.

A first end portion 208 of a first drive shaft 210 is drivingly connected to an end of the transmission output shaft 206 opposite the transmission 204 via a first coupling assembly 212. As a non-limiting example, the first coupling assembly 212 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

A second end portion 214 of the first drive shaft 210 is drivingly connected to a second coupling assembly 216. As a non-limiting example, the second coupling assembly 216 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 216, opposite the first drive shaft 210, is a second drive shaft 218. The second drive shaft 218 drivingly connects the transmission 204 to a forward tandem axle system 220 of a tandem axle system 222 having an inter-axle differential 224. As illustrated in FIG. 2 of the disclosure, a first end portion 224 of the second drive shaft 218 is drivingly connected to an end of the second coupling assembly 216 opposite the first drive shaft 210. A second end portion 226 of the second drive shaft 218 is drivingly connected to an end of a third coupling assembly 228. As a non-limiting example, the third coupling assembly 228 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the third coupling assembly 228, opposite the second drive shaft 218, is an end of a forward tandem axle system input shaft 230. An end of the forward tandem axle system input shaft 230, opposite the second drive shaft 218, is drivingly connected to the inter-axle differential 224 of the forward tandem axle system 220. As a non-limiting example, the forward tandem axle system input shaft 230 is an inter-axle differential input shaft, a coupling shaft, stub shaft or an inter-axle differential pinion shaft. The inter-axle differential 224 is a device that divides the rotational power generated by the engine 204 between the axles in a vehicle 200. The rotational power is transmitted through the forward tandem axle system 220 as described in more detail below.

As illustrated in FIG. 2 of the disclosure, the inter-axle differential 224 is drivingly connected to a forward tandem axle differential 232 and a forward tandem axle system output shaft 234. The forward tandem axle differential 232 is a set of gears that allows the outer drive wheel(s) of a wheeled vehicle to rotate at a faster rate than the inner drive wheel(s).

The forward tandem axle system 220 further includes a first forward tandem axle half shaft 236 and a second front tandem axle half shaft 238. The first forward tandem axle half shaft 236 extends substantially perpendicular to the forward tandem axle system input shaft 230. A first end portion 240 of the first forward tandem axle half shaft 236 is drivingly connected to a first forward tandem axle wheel assembly 242 and a second end portion 244 of the first forward tandem axle half shaft 236 is drivingly connected to an end of the forward tandem axle differential 232. As a non-limiting example, the second end portion 244 of the first forward tandem axle half shaft 236 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 230 is the second front tandem axle half shaft 238. A first end portion 246 of the second forward tandem axle half shaft 238 is drivingly connected to a second forward tandem axle wheel assembly 248. A second end portion 250 of the second forward tandem axle half shaft 238 is drivingly connected to an end of the forward tandem axle differential 232 opposite the first forward tandem axle half shaft 236. As a non-limiting example, the second end portion 250 of the second forward tandem axle half shaft 238 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 234 is drivingly connected to a side of the inter-axle differential 224 opposite the second drive shaft 218. An end of the forward tandem axle system output shaft 234, opposite the inter-axle differential 224, is drivingly connected to a first end portion 252 of a third drive shaft 254 via a fourth coupling assembly 256. As a non-limiting example, the fourth coupling assembly 256 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

A second end portion 258 of the third drive shaft 254 is drivingly connected to a fourth drive shaft 260 via a fifth coupling assembly 262. As a non-limiting example, the fifth coupling assembly 262 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 2 of the disclosure, a first end portion 264 of the fourth drive shaft 260 is drivingly connected to an end of the fifth coupling assembly 262. The fourth drive shaft 260 drivingly connects the inter-axle differential 224 to a rear tandem axle system 266 having a rear tandem axle differential 268. A second end portion 270 of the fourth drive shaft 260 is drivingly connected to an end of an sixth coupling assembly 272. As a non-limiting example, the sixth coupling assembly 272 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the sixth coupling assembly 272, opposite the fourth drive shaft 260 is an end of a rear tandem axle system input shaft 274. As a non-limiting example, the rear tandem axle input shaft 274 is a rear tandem axle differential input shaft, a coupling shaft, stub shaft or a rear tandem axle differential pinion shaft. Drivingly connected to an end of the rear tandem axle input shaft 274, opposite the fourth drive shaft 260, is the rear tandem axle differential 268. The rear tandem axle differential 268 is a set of gears that allows the outer drive wheel(s) of the wheeled vehicle to rotate at a faster rate that the inner drive wheel(s). The rotational power is transmitted through the rear tandem axle system 266 as described in more detail below.

The rear tandem axle system 266 further includes a first rear tandem axle half shaft 276 and a second rear tandem axle half shaft 278. The first rear tandem axle half shaft 276 extends substantially perpendicular to the rear tandem axle system input shaft 274. A first end portion 280 of the first rear tandem axle half shaft 276 is drivingly connected to a first rear tandem axle wheel assembly 282 and a second end portion 284 of the first rear tandem axle half shaft 276 is drivingly connected to an end of the rear tandem axle differential 268. As a non-limiting example, the second end portion 284 of the first rear tandem axle half shaft 276 is drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 274 is the second forward tandem axle half shaft 278. A first end portion 286 of the second rear tandem axle half shaft 278 is drivingly connected to a second rear tandem axle wheel assembly 288. A second end portion 290 of the second rear tandem axle half shaft 278 is drivingly connected to an end of the rear tandem axle differential 268 opposite the first rear tandem axle half shaft 276. As a non-limiting example, the second end portion 290 of the second rear tandem axle half shaft 278 is drivingly connected to a rear tandem axle differential side gear, a separate stub shaft, a separate coupling shaft, a second rear tandem axle differential output shaft and/or a shaft that is formed as part of a rear tandem axle differential side gear.

It is within the scope of this disclosure that one or more of the coupling assemblies 212, 216, 228, 256, 262 and 272 may be a constant velocity joint assembly according to an embodiment of the disclosure.

Figure 3:
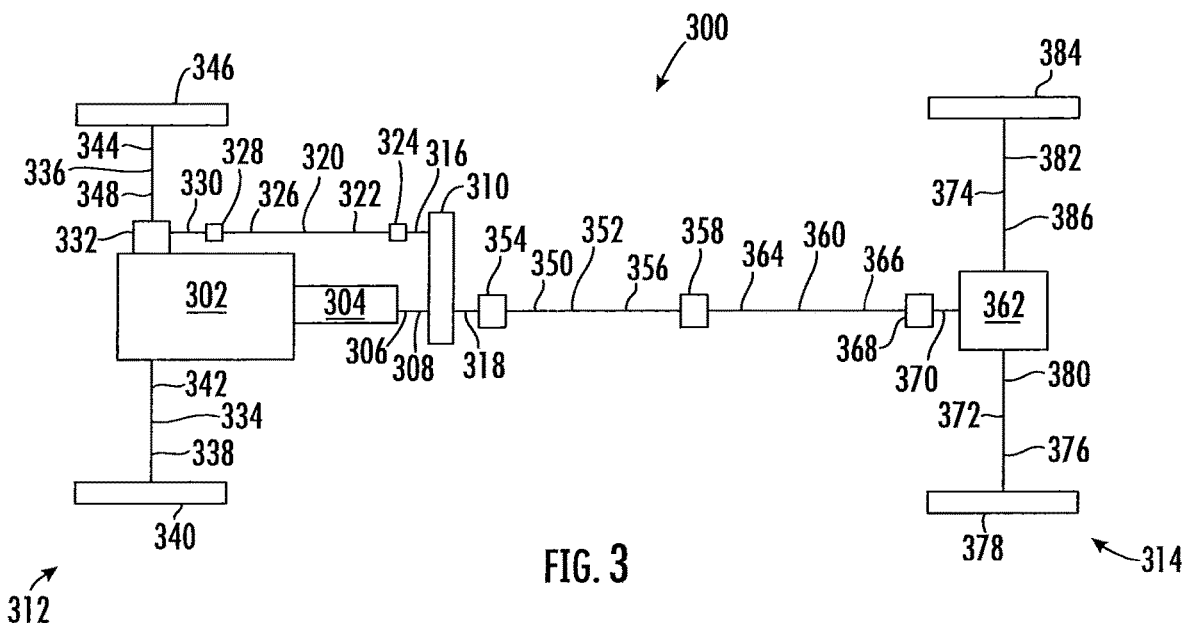
FIG. 3 is a schematic top-plan view of yet another vehicle having one or more constant velocity joint assemblies according to an embodiment of the disclosure.

FIG. 3 is a schematic top-plan view of yet another vehicle 300 having one or more constant velocity joint assemblies according to an embodiment of the disclosure. The vehicle 300 has an engine 302 which is drivingly connected to a transmission 304. A transmission output shaft 306 is then drivingly connected to an end of the transmission 304 opposite the engine 302. The transmission 304 is a power management system which provides controlled application of the rotational energy generated by the engine 302 by means of a gearbox.

The transmission output shaft 306 is drivingly connected to a transfer case input shaft 308 which in turn is drivingly connected to a transfer case 310. The transfer case 310 is used to transfer the rotational power from the transmission 304 to a front axle system 312 and a rear axle system 314 by utilizing a series of gears and drive shafts. The transfer case 310 includes a first transfer case output 316 shaft and a second transfer case output shaft 318.

A first drive shaft 320 extends from the first transfer case output shaft 316 to the front axle system 312 of the vehicle 300. A first end portion 322 of the first drive shaft 320 is drivingly connected to an end of the first transfer case output shaft 316 opposite the transfer case 310 via a first coupling assembly 324. As a non-limiting example, the first coupling assembly 324 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. A second end portion 326 of the first drive shaft 320 is drivingly connected to a second coupling assembly 328. As a non-limiting example, the second coupling assembly 328 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 328 is an end of a front axle system input shaft 330. As a non-limiting example, the front axle system input shaft 330 is a front axle differential input shaft, a coupling shaft, stub shaft or a front axle differential pinion shaft. Drivingly connected to an end of the front axle system input shaft 330, opposite the first drive shaft 320, is a front axle differential 332. The front axle differential 332 is a set of gears that allows the outer drive wheel(s) of the wheeled vehicle to rotate at a faster rate that the inner drive wheel(s). The rotational power is transmitted through the front axle system 312 as described in more detail below.

The front axle system 312 further includes a first front axle half shaft 334 and a second front axle half shaft 336. The first front axle half shaft 334 extends substantially perpendicular to the front axle system input shaft 330. A first end portion 338 of the first front axle half shaft 334 is drivingly connected to a first front axle wheel assembly 340 and a second end portion 342 of the first front axle half shaft 334 is drivingly connected to an end of the front axle differential 332. As a non-limiting example, the second end portion 342 of the first front axle half shaft 334 is drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 330 is the second front axle half shaft 336. A first end portion 344 of the second front axle half shaft 336 is drivingly connected to a second front axle wheel assembly 346. A second end portion 348 of the second front axle half shaft 336 is drivingly connected to an end of the front axle differential 332 opposite the first front axle half shaft 334. As a non-limiting example, the second end portion 348 of the second front axle half shaft 336 is drivingly connected to a front axle differential side gear, a separate stub shaft, a separate coupling shaft, a second front axle differential output shaft and/or a shaft that is formed as part of a front axle differential side gear.

An end of the second transfer case output shaft 318 is drivingly connected to an end of the transfer case 310 opposite the transfer case input shaft 308. As illustrated in FIG. 3 of the disclosure, a first end portion 350 of a second drive shaft 352 is drivingly connected to an end of the second transfer case output shaft 318 opposite the transfer case 310 via a third coupling assembly 354. As non-limiting example, the third coupling assembly 354 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

A second end portion 356 of the second drive shaft 352 is drivingly connected to a fourth coupling assembly 358. As a non-limiting example, the fourth coupling assembly 358 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fourth coupling assembly 358, opposite the second drive shaft 352, is a third drive shaft 360. The third drive shaft 360 drivingly connects the transfer case 310 to a rear differential 362 of the rear axle system 314. As illustrated in FIG. 3 of the disclosure, a first end portion 364 of the third drive shaft 360 is drivingly connected to an end of the fourth coupling assembly 358 opposite the second drive shaft 352. A second end portion 366 of the third drive shaft 360 is drivingly connected to an end of a fifth coupling assembly 368. As a non-limiting example, the fifth coupling assembly 368 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fifth coupling assembly 368, opposite the third drive shaft 360, is an end of a rear axle system input shaft 370. An end of the rear axle system input shaft 370, opposite the third drive shaft 360, is drivingly connected to the rear differential 362 of the rear axle system 314. As a non-limiting example, the rear axle system input shaft 370 is a rear differential input shaft, a coupling shaft, stub shaft or a rear axle differential pinion shaft. The rear axle differential 362 is a set of gears that allows the outer drive wheel(s) of the wheeled vehicle to rotate at a faster rate that the inner drive wheel(s). The rotational power is transmitted through the rear axle system 314 as described in more detail below.

The rear axle system 314 further includes a first rear axle half shaft 372 and a second rear axle half shaft 374. The first rear axle half shaft 372 extends substantially perpendicular to the rear axle system input shaft 370. A first end portion 376 of the first rear axle half shaft 372 is drivingly connected to a first rear axle wheel assembly 378 and a second end portion 380 of the first rear axle half shaft 372 is drivingly connected to an end of the rear axle differential 362. As a non-limiting example, the second end portion 380 of the first rear axle half shaft 372 is drivingly connected to a rear axle differential side gear, a separate stub shaft, a separate coupling shaft, a first rear axle differential output shaft and/or a shaft that is formed as part of a rear axle differential side gear.

Extending substantially perpendicular to the rear axle system input shaft 370 is the second rear axle half shaft 374. A first end portion 382 of the second rear axle half shaft 374 is drivingly connected to a second rear axle wheel assembly 384. A second end portion 386 of the second rear axle half shaft 374 is drivingly connected to an end of the rear axle differential 362 opposite the first rear axle half shaft 372. As a non-limiting example, the second end portion 386 of the second rear axle half shaft 374 is drivingly connected to a rear axle differential side gear, a separate stub shaft, a separate coupling shaft, a second rear axle differential output shaft and/or a shaft that is formed as part of a rear axle differential side gear.

It is within the scope of this disclosure that one or more of the coupling assemblies 324, 328, 354, 358 and 368 may be a constant velocity joint assembly according to an embodiment of the disclosure.

Figure 4:
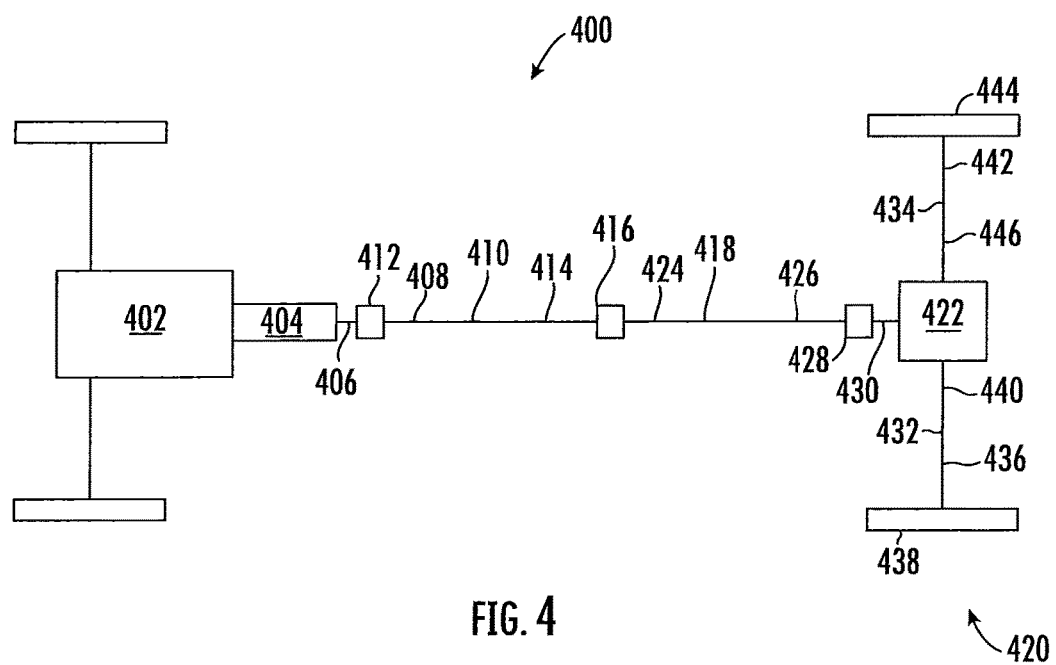
FIG. 4 is a schematic top-plan view of still yet another vehicle having one or more constant velocity joint assemblies according to an embodiment of the disclosure.

FIG. 4 is a schematic top-plan view of still yet another vehicle 400 having one or more constant velocity joint assemblies according to an embodiment of the disclosure. The vehicle 400 has an engine 402 which is drivingly connected to a transmission 404. A transmission output shaft 406 is drivingly connected to an end of the transmission 404 opposite the engine 402. The transmission 404 is a power management system which provides controlled application of the rotational power generated by the engine by means of a gear box.

A first end portion 408 of a first drive shaft 410 is drivingly connected to an end of the transmission output shaft 406 opposite the transmission 404 via a first coupling assembly 412. As a non-limiting example, the first coupling assembly 412 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

A second end portion 414 of the first drive shaft 410 is drivingly connected to a second coupling assembly 416. As a non-limiting example, the second coupling assembly 416 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 416, opposite the first drive shaft 410, is a second drive shaft 418. The second drive shaft 418 drivingly connects the transmission 404 to a rear axle system 420 having rear axle differential 424. As illustrated in FIG. 4 of the disclosure, a first end portion 424 of the second drive shaft 418 is drivingly connected to an end of the second coupling assembly 416 opposite the first drive shaft 410. A second end portion 426 of the second drive shaft 418 is drivingly connected to an end of a third coupling assembly 428. As a non-limiting example, the third coupling assembly 428 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the third coupling assembly 426, opposite the second drive shaft 418, is an end of a rear axle system input shaft 430. An end of the forward tandem axle system input shaft 430, opposite the second drive shaft 418, is drivingly connected to the rear axle differential 422 of the rear axle system 420. As a non-limiting example, the rear axle system input shaft 430 is a rear axle differential input shaft, a coupling shaft, stub shaft or a rear axle differential pinion shaft. The rear axle differential 422 is a set of gears that allows the outer drive wheel(s) of the wheeled vehicle to rotate at a faster rate that the inner drive wheel(s). The rotational power is transmitted through the rear axle system 420 as described in more detail below.

The rear axle system 420 further includes a first rear axle half shaft 432 and a second rear axle half shaft 434. The first rear axle half shaft 432 extends substantially perpendicular to the rear axle system input shaft 430. A first end portion 436 of the first rear axle half shaft 432 is drivingly connected to a first rear axle wheel assembly 438 and a second end portion 440 of the first rear axle half shaft 432 is drivingly connected to an end of the rear axle differential 422. As a non-limiting example, the second end portion 440 of the first rear axle half shaft 432 is drivingly connected to a rear axle differential side gear, a separate stub shaft, a separate coupling shaft, a first rear axle differential output shaft and/or a shaft that is formed as part of a rear axle differential side gear.

Extending substantially perpendicular to the rear axle system input shaft 430 is the second rear axle half shaft 434. A first end portion 442 of the second rear axle half shaft 434 is drivingly connected to a second rear axle wheel assembly 444. A second end portion 446 of the second rear axle half shaft 434 is drivingly connected to an end of the rear axle differential 422 opposite the first rear axle half shaft 432. As a non-limiting example, the second end portion 446 of the second rear axle half shaft 434 is drivingly connected to a rear axle differential side gear, a separate stub shaft, a separate coupling shaft, a second rear axle differential output shaft and/or a shaft that is formed as part of a rear axle differential side gear.

It is within the scope of this disclosure that one or more of the coupling assemblies 412, 416 and 428 may be a constant velocity joint assembly according to an embodiment of the disclosure.

Figure 5:
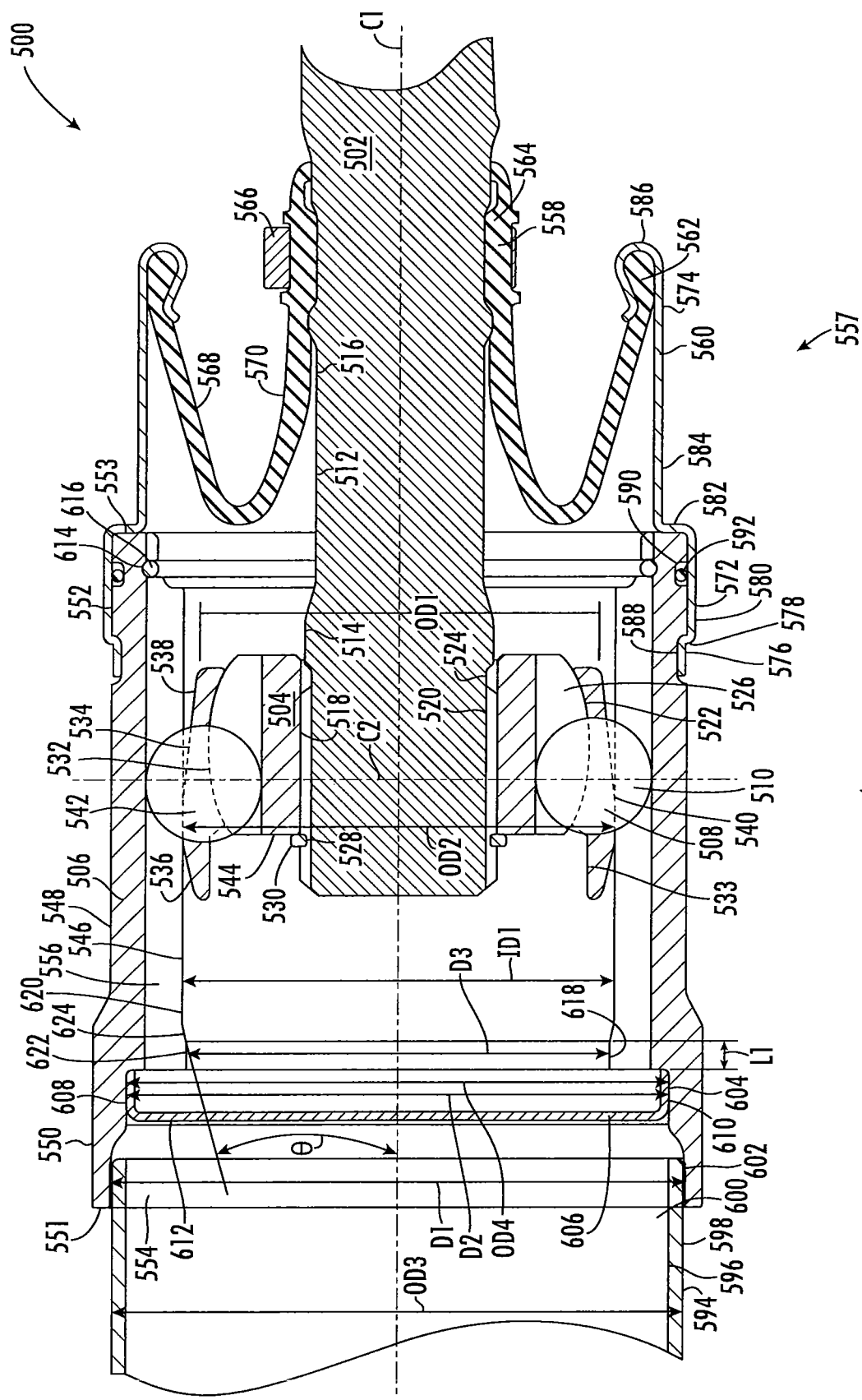
FIG. 5 is a cut-away schematic side-view of a constant velocity joint assembly having a crash collapse feature according to an embodiment of the disclosure when the constant velocity joint assembly is in a first position.
Figure 6:
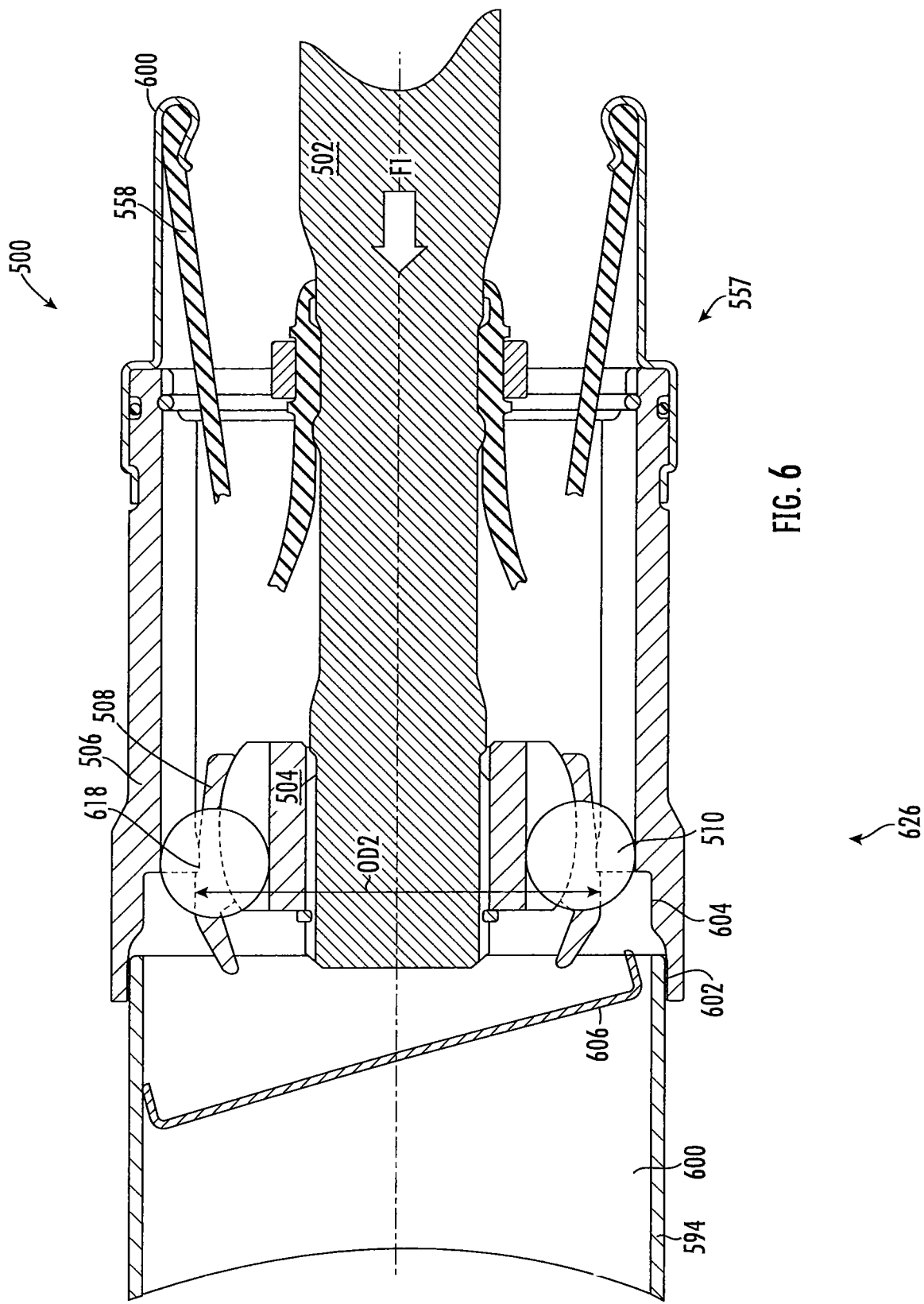
FIG. 6 is a cut-away schematic side-view of the constant velocity joint assembly illustrated in FIG. 5 in a second position.

FIGS. 5 and 6 are a cut-away schematic side-view of a constant velocity joint assembly 500 having a crash collapse feature according to an embodiment of the disclosure. When the constant velocity joint assembly 500 is in the position illustrated in FIG. 5 of the disclosure, the constant velocity joint assembly 500 is in a first position 501. As illustrated in FIG. 5 of the disclosure, the constant velocity joint assembly 500 includes a first shaft 502, an inner race 504, an outer race 506, a cage 508 and one or more torque transfer elements 510. In accordance with an embodiment of the disclosure and as a non-limiting example, the constant velocity joint assembly 500 is a double offset constant velocity joint having plunging and articulation capabilities. It is within the scope of this disclosure and as a non-limiting example, that the first shaft 502 is a propeller shaft, a drive shaft, a cardan shaft, a double cardan shaft, a universal joint shaft, a universal coupling shaft, a Hooke's joint shaft, a pinion shaft, a differential input shaft, a differential pinion shaft, a front axle input shaft, a front axle differential pinion shaft, a forward tandem axle input shaft, a forward tandem axle differential output shaft, a rear tandem axle input shaft, a rear tandem axle differential pinion shaft, an inter-axle differential pinion shaft, a stub shaft or a tube shaft.

As best seen in FIG. 5 of the disclosure, the first shaft 502 of the constant velocity joint assembly 500 has an outer surface 512, a first end portion 514, a second end portion (not shown) and an intermediate portion 516 interposed between the first end portion 514 and the second end portion (not shown) of the first shaft 502. Circumferentially extending along at least a portion of the outer surface 516 of the first end portion 514 of the first shaft 502 is a plurality of axially extending shaft splines 518. As a non-limiting example, the first shaft 502 is a propeller shaft, a drive shaft, a cardan shaft, a double cardan shaft, a universal joint shaft, a universal coupling shaft, a Hooke's joint shaft, a pinion shaft, a differential input shaft, a differential pinion shaft, a front axle input shaft, a front axle differential pinion shaft, a forward tandem axle input shaft, a forward tandem axle differential output shaft, a rear tandem axle input shaft, a rear tandem axle differential pinion shaft, an inter-axle differential pinion shaft, a stub shaft or a tube shaft.

Extending co-axially with and drivingly connected to the first shaft 502 is the inner race 504 of the constant velocity joint assembly 500. As best seen in FIG. 5 of the disclosure, the inner race 504 has an inner surface 520 and an outer surface 522. Circumferentially extending along at least a portion of the inner surface 520 of the inner race 504 of the constant velocity joint assembly 500 is a plurality of axially extending inner race splines 524. The plurality of axially extending inner race splines 524 are complementary to and meshingly engaged with the plurality of axially extending splines 518 on the first end portion 514 of the first shaft 502 of the constant velocity joint assembly 500.

Circumferentially extending along at least a portion of the outer surface 522 of the inner race 504 of the constant velocity joint assembly 500 is one or more inner race torque transfer element grooves 526. The one or more inner race torque transfer element grooves 526 are of a size and a shape to receive at least a portion of the one or more torque transfer elements 510 of the constant velocity joint assembly 500.

As best seen in FIG. 5 of the disclosure, a shaft snap-ring groove 528 circumferentially extends along at least a portion of the outer surface 512 of the first end portion 514 of the first shaft 502. In accordance with an embodiment of the disclosure and as a non-limiting example, the shaft snap-ring groove 528 is disposed within the plurality of axially extending shaft splines 518 on the outer surface 512 of the first end portion 514 of the first shaft 502. The shaft snap-ring groove 528 is of a size and shape to receive at least a portion of a snap-ring 530. When disposed within the shaft snap-ring groove 528, at least a portion of the snap-ring 530 is in contact with the inner race 504 of the constant velocity joint assembly 500. As a result, the snap-ring 530 axially restrains the inner race 504 to the first end portion 514 of the first shaft 502 of the constant velocity joint assembly 500.

Interposed between the inner race 504 and the outer race 506 of the constant velocity joint assembly 500 is the cage 508. As best seen in FIG. 5 of the disclosure, the cage 508 has a first inner surface 532, a second inner surface 533, an outer surface 534, a first end portion 536, a second end portion 538 and an intermediate portion 540 disposed between the first and second end portions 536 and 538 of the cage 508. Extending from the first and/or the second inner surface 532 and 533 to the outer surface 534 of the cage 508 is one or more torque transfer element retaining openings 542. The one or more torque transfer element retaining openings 542 in the cage 508 are of a size and shape to receive and/or retain at least a portion of one or more of the one or more torque transfer elements 510.

As best seen in FIG. 5 of the disclosure and as a non-limiting example, the first inner surface 532 of the cage 508 is slidingly engaged with the outer surface 522 of the inner race 504 of the joint assembly 500. In accordance with this embodiment of the disclosure, the first inner surface 532 of the cage 508 has a shape that is complementary to an outer surface 522 of the inner race 504 of the joint assembly 500.

Additionally, as best seen in FIG. 5 of the disclosure, at least a portion of the second inner surface 533 of the cage 508 extends axially inboard beyond an axially inboard end 544 of the inner race 504 of the joint assembly 500. In accordance with this embodiment of the disclosure and as a non-limiting example, the second inner surface 533 of the cage 508 is substantially cylindrical in shape.

According to an embodiment of the disclosure and as a non-limiting example, when the joint assembly 500 is assembled, one or more torque transfer elements 510 and the cage 508 have a centerline C2 that is different than the centerline of the inner race 504 of the joint assembly 500.

The outer surface 534 of the cage 508 has an outer diameter OD1 and an outermost diameter OD2 at the intermediate portion 540 of the cage 508. In accordance with the embodiment of the disclosure illustrated in FIG. 5 of the disclosure, the outer diameter OD1 of the outer surface 534 of the cage 508 increases from the first end portion 536 to the intermediate portion 540 of the cage 508. Additionally, the outer diameter OD1 of the outer surface 534 of the cage 508 decreases from the intermediate portion 540 to the second end portion 538 of the cage 508. In accordance with the embodiment of the disclosure illustrated in FIG. 5 and as a non-limiting example, the outer diameter OD1 of the cage 508 increases at a faster rate from the first end portion 536 to the intermediate portion 540 of the cage 508 than from the second end portion 538 to the intermediate portion 540 of the cage 508.

Disposed at least partially radially outboard from the first shaft 502, the inner race 504, the cage 508 and the one or more torque transfer elements 510 is the outer race 506 of the constant velocity joint assembly 500. As best seen in FIG. 5 of the disclosure, the outer race 506 has an inner surface 546, an outer surface 548, a first end portion 550, a second end portion 552, a first end 551 and a second end 553. The inner surface 546 and the outer surface 548 of the outer race 506 defines a hollow portion 554 therein. As best seen in FIG. 5 of the disclosure, at least a portion of the first shaft 502, the inner race 504, the cage 508 and the one or more torque transfer elements 510 are disposed within the hollow portion 554 of the outer race 506 of the constant velocity joint assembly 500.

Circumferentially extending along at least a portion of the inner surface 546 of the outer race 506 is one or more outer race torque transfer element grooves 556. The one or more outer race torque transfer element grooves 556 are of a shape to receive at least a portion of the one or more torque transfer elements 510. As a result, the one or more one or more torque transfer elements 510 drivingly connects the inner race 504 to the outer race 506 of the constant velocity joint assembly 500.

As best seen in FIG. 5 of the disclosure, the one or more outer race torque transfer element grooves 556 have an innermost diameter ID1. It is within the scope of this disclosure and as a non-limiting example that the innermost diameter ID1 of the outer race 506 may be substantially equal to or slightly greater than the outermost diameter OD2 of the cage 508 of the constant velocity joint assembly 500.

Disposed radially outboard from the first shaft 502 of the constant velocity joint assembly 500 is a boot assembly 557 including a flexible boot 558. The flexible boot 558 has a first end portion 562 and a second end portion 564. The flexible boot 558 provides a flexible seal for the joint assembly 500 preventing the migration of dust, debris and moisture from the external environment into the joint assembly 500. As a non-limiting example, the flexible boot 558 is made of a polymeric material, a rubber material, an elastomeric material, a thermoplastic material or a combination thereof.

At least a portion of the second end portion 564 of the flexible boot 558 is connected to at least a portion of the outer surface 512 of the first shaft 502 of the constant velocity joint assembly 500. In accordance with an embodiment of the disclosure and as a non-limiting example, the second end portion 564 of the flexible boot 558 is connected to the outer surface 512 of the first shaft 502 by using a boot retention member 566. As a non-limiting example, the boot retention member 566 is a boot clamp.

In accordance with the embodiment of the disclosure illustrated in FIG. 5 and as a non-limiting example, the flexible boot 558 has a substantially V-shaped cross-section having an axially inboard extending boot leg 568 and an axially outboard extending boot leg 570. According to this embodiment of the disclosure at least a portion of the axially outboard extending boot leg 570, opposite to the axially inboard extending boot leg 568, is connected to at least a portion of the outer surface 512 of the first shaft 502 via the boot retention member 566.

At least a portion of the first end portion 562 of the flexible boot 558 is connected to at least a portion of the outer surface 548 of the second end portion 552 of the outer race 506 of the constant velocity joint assembly 500. In accordance with the embodiment of the disclosure illustrated in FIG. 5 and as a non-limiting example, the first end portion 562 of the flexible boot 558 is connected to the outer surface 548 of the outer race 506 by using a boot can 560 having a first end portion 572 and a second end portion 574. As best seen in FIG. 5 of the disclosure, at least a portion of the first end portion 572 of the boot can 560 of the boot assembly 557 is connected to the outer surface 548 of the second end portion 552 of the outer race 506. Additionally, as best seen in FIG. 5 of the disclosure, at least a portion of the second end portion 574 of the boot can 560 is connected to at least a portion of the first end portion 562 of the flexible boot 558 of the constant velocity joint assemble 500. The boot can 560 aids in protecting the flexible boot 558 from damage due to impact from debris when the vehicle (not shown) is in operation. As a non-limiting example, the boot can 560 is made of substantially rigid material such as a metallic material, an aluminium alloy, a steel alloy, a carbon fibre material or a composite material.

In accordance with the embodiment of the disclosure illustrated in FIG. 5 and as a non-limiting example, the boot can 560 includes, in axial order from the first to the second end portion 572 and 574 of the boot can 560, a first substantially horizontal portion 576, a radially outward extending portion 578, a second substantially horizontal portion 580, a radially inward extending portion 582, a third substantially horizontal portion 584 and a hook-shaped portion 586. As best seen in FIG. 5 of the disclosure, at least a portion of the first substantially horizontal portion 576 of the boot can 560 is disposed within a boot can receiving groove 588 circumferentially extending along at least a portion of the outer surface 548 of the second end portion 552 of the outer race 506. This aids in retaining ensuring the boot can 560 is properly secured to the outer surface 548 of the outer race 506 of the constant velocity joint assembly 500.

At least a portion of the radially inward extending portion 582 of the boot can 560 is in direct contact with at least a portion of the second end 553 of the outer race 506. The radially inward extending portion 582 of the boot can 560 acts as a stopper to prevent the boot can 560 from extending along the outer surface 548 of the second end portion 552 of the outer race 506 beyond a pre-determined distance.

Circumferentially extending along at least a portion of the outer surface 548 of the second end portion 552 of the outer race 506 is an O-ring groove 590. As best seen in FIG. 5 of the disclosure, the O-ring groove 590 is interposed between the boot can receiving groove 588 and the second end 553 of the outer race 506 of the constant velocity joint assembly 500. The O-ring groove 590 on the outer surface 548 of the second end portion 552 of the outer race 506 is of a size and a shape to receive at least a portion of an O-ring 592 disposed therein. The O-ring 592 provides a sealing engagement between the boot can 560 and the outer race 506 of the constant velocity joint assembly 500.

Finally, as best seen in FIG. 5 of the disclosure, at least a portion of the first end portion 562 of the flexible boot 558 is disposed within and retained by the hook-shaped portion 586 of the boot can 560.

Extending co-axially with an integrally connected to the outer race 506 of the constant velocity joint assembly 500 is a second shaft 594 having an inner surface 596 and an outer surface 598 defining a hollow portion 600 therein. It is within the scope of this disclosure and as a non-limiting example that the second shaft 594 is a propeller shaft, a drive shaft, a cardan shaft, a double cardan shaft, a universal joint shaft, a universal coupling shaft, a Hooke's joint shaft, a pinion shaft, a differential input shaft, a differential pinion shaft, a front axle input shaft, a front axle differential pinion shaft, a forward tandem axle input shaft, a forward tandem axle differential output shaft, a rear tandem axle input shaft, a rear tandem axle differential pinion shaft, an inter-axle differential pinion shaft, a stub shaft or a tube shaft.

In accordance with an embodiment of the disclosure and as a non-limiting example, at least a portion of the second shaft 594 is received within a first receiving portion 602 of the outer race 506. As best seen in FIG. 5 of the disclosure, the first receiving portion 602 circumferentially extends along at least a portion of the inner surface 546 of the outer race 506 and extends axially inward from the first end 551 of the outer race 506 of the constant velocity joint assembly 500. According to an embodiment of the disclosure and as a non-limiting example, the first receiving portion 602 of the outer race 506 may have a diameter D1 that is substantially equal to or slightly greater than an outer diameter OD3 of the second shaft 594. In accordance with an alternative embodiment of the disclosure and as a non-limiting example, the first receiving portion 602 of the outer race 506 may have a diameter D1 that is slightly less than the outer diameter OD3 of the second shaft 594 so as to provide a press-fit. As a non-limiting example, at least a portion of the first end portion 550 of the outer race 506 may be integrally connected to at least a portion of the second shaft 594 by using one or more welds, one or more mechanical fasteners, a threaded connection and/or a splined connection.

Interposed between the first receiving portion 602 and the one or more outer race torque transfer element grooves 556 is a second receiving portion 604. As best seen in FIG. 5 of the disclosure, the second receiving portion 604 circumferentially extends along at least a portion of the inner surface 546 of the first end portion 550 of the outer race 506 between the first receiving portion 602 and the one or more outer race torque transfer element grooves 556. The second receiving portion 604 has a diameter D2 that is smaller than the diameter D1 of the first receiving portion 602. Additionally, the diameter D2 of the second receiving portion 604 is greater than the innermost diameter ID1 of the one or more outer race torque transfer element grooves 556.

The second receiving portion 604 of the outer race 506 is of a size and shape to receive and/or retain a plug member 606. In accordance with an embodiment of the disclosure and as a non-limiting example, the plug member 606 is substantially cylindrical in shape and has a first substantially horizontal portion 608, a second substantially horizontal portion 610 and a radially inward extending portion 612 connecting the first and second substantially horizontal portions 608 and 610 plug member 606. As best seen in FIG. 5 of the disclosure, the plug member 606 of the constant velocity joint assembly 500 has an outer diameter OD4 that is substantially equal to, slightly less than or slightly greater than the diameter D2 of the second receiving portion 604. According to an embodiment of the disclosure and as a non-limiting example, the plug member 606 may be press-fit into the second receiving portion 604 of the constant velocity joint assembly 500. In accordance with an alternative embodiment of the disclosure and as a non-limiting example, the plug member 606 may be secured within the second receiving portion 604 of the outer race 506 by using one or more welds, such as but not limited to one or more tack welds. The plug member 606 aids in preventing the migration of one or more lubrication fluids (not shown) from outside the constant velocity joint assembly 500 thereby ensuring the joint 500 has proper lubrication when in operation.

Circumferentially extending along at least a portion of the inner surface 546 of the second end portion 552 of the outer race 506 is a retaining member groove 614. In accordance with the embodiment of the disclosure illustrated in FIG. 5 and as a non-limiting example, the retaining member groove 614 is disposed within the one or more outer race torque transfer element grooves 556. The retaining member groove 614 is of a size and shape to receive and/or retain at least a portion of a retaining member 616. The retaining member 616 aids in preventing the constant velocity joint assembly 500 from axially moving beyond a predetermined amount. When the portion of the retaining member 616 extending into the one or more outer race torque transfer element grooves 556 comes into direct contact with the one or more torque transfer elements 510, it prevents the first shaft 502, the inner race 504, the cage 508 and the one or more torque transfer elements 510 from becoming disconnected to the outer race 506 of the constant velocity joint 500. As a result, the retaining member 616 aids in ensuring that the constant velocity joint assembly 500 does not inadvertently pull apart. As a non-limiting example, the retaining member 616 is a snap-ring.

One or more crash collapse features 618 circumferentially extend radially inward along at least a portion of the inner surface 546 of the outer race 506 of the constant velocity joint assembly 500. As best seen in FIG. 5 of the disclosure, the one or more crash collapse features 618 extends radially inward from at least a portion of an innermost surface 620 of the outer race 506 and may be disposed proximate to the second receiving portion 602 and/or the one or more outer race torque transfer element grooves 556 of the outer race 506. Additionally, as best seen in FIG. 5 of the disclosure, the one or more crash collapse features 618 has a substantially cylindrical portion 622 having a diameter D3 that is less than the innermost diameter ID1 of the one or more outer race torque transfer element grooves 556 on the inner surface 546 of the outer race 506. By providing the constant velocity joint assembly 500 with one or more crash collapse features 618 in this location, it allows the inner race 504 to plunge axially relative to the outer race 506 when in operation and provides the constant velocity joint assembly 500 with a positive stopping feature preventing the inner race 504 and the cage 508 from plunging beyond a pre-determined amount when in normal operation. This prevents the inner race 504 from becoming drivingly disengaged from the outer race 506 prematurely during normal operating conditions. As a result, it is to be understood that the one or more crash collapse features 618 allow the constant velocity joint assembly 500 to retain full plunging and articulation capabilities, while preventing premature disengagement of the inner race 504 and allowing the first shaft 502 to collapse within the second shaft 594 upon the occurrence of a crash condition.

In accordance with the embodiment illustrated in FIG. 5 and as a non-limiting example, the substantially cylindrical portion 622 of the one or more crash collapse features 618 may have a length L1. As a non-limiting example, the length L1 of the substantially cylindrical portion 622 of the one or more crash collapse features 618 may be from approximately 0 to 25 mm or may be from approximately 1 mm to approximately 25 mm. By making the length L1 of the substantially cylindrical portion 622 of the one or more crash collapse features 618 may be from approximately 1 mm to approximately 25 mm, it provides the one or more crash collapse features 618 and/or the chamfer portion 624 with the strength needed in order to prevent the one or more crash collapse features 618 from collapsing or deforming prematurely during normal operation of the constant velocity joint assembly 500. As a result, it is therefore to be understood that the length L1 being from approximately 1 mm to approximately 25 mm provides a critical range needed to ensure that the one or more crash collapse features 618 have the strength needed to ensure normal operation of the constant velocity joint assembly 500 during normal operation while still allowing the first shaft 502 to collapse within the second shaft 594 upon the occurrence of a crash condition.

According to an embodiment of the disclosure and as a non-limiting example, the ratio of the outermost diameter OD2 of the cage 508 (i.e. the outer spherical diameter)/the diameter D3 of the substantially cylindrical portion 622 of the one or more crash collapse features 618 may be from approximately 1.0002 to approximately 1.5. By providing the constant velocity joint assembly 500 with one or more crash collapse features 618 with a ratio of the outermost diameter OD2/the diameter D3 from approximately 1.0002 to approximately 1.5, it provides the one or more crash collapse features 618 with the resistance needed to allow the constant velocity joint assembly 500 to operate normally during normal operating conditions. Additionally, by providing the constant velocity joint assembly 500 with one or more crash collapse features 618 with a ratio of the outermost diameter OD2/the diameter D3 from approximately 1.0002 to approximately 1.5, it ensures that the cage 508 will only collapse upon application of a pre-determine amount of force during a crash condition. As a result, it is to be understood that the ratio of the outermost diameter OD2/the diameter D3 from approximately 1.0002 to approximately 1.5 provides a critical range where the one or more crash collapse features 618 act as a stopper feature during normal operating conditions but allows the one or more crash collapse features 618 to collapse the cage 508 during a crash condition allowing the first shaft 502 to collapse within the second shaft 594.

Additionally, according to an alternative embodiment of the disclosure and as a non-limiting example, the ratio of the length L1 of the substantially cylindrical portion 622/the diameter D3 of the substantially cylindrical portion 622 of the one or more crash collapse features 618 may be from approximately 0.002 to approximately 0.5. By providing a constant velocity joint assembly 500 with a ratio of the length L1/the diameter D3 from approximately 0.002 to approximately 0.5, it provides the crash collapse feature with the strength needed to allow the constant velocity joint assembly 500 to operate normally during normal operating conditions. Additionally, by providing the constant velocity joint assembly 500 with one or more crash collapse features 618 with a ratio of the length L1/the diameter D3 from approximately 0.002 to approximately 0.5, it ensures that the cage 508 will only collapse upon application of a pre-determined amount of force during a crash condition. As a result, it is to be understood that the ratio of the length L1/the diameter D3 from approximately 0.002 to approximately 0.5 provides a critical range where the one or more crash collapse features 618 act as a stopper feature during normal operating conditions but allows the one or more crash collapse features 618 to collapse the cage 508 during a crash condition allowing the first shaft 502 to collapse within the second shaft 594.

In accordance with the embodiment of the disclosure illustrated in FIG. 5 and as a non-limiting example, the one or more crash collapse features 618 may include a chamfer portion 624 connecting the substantially cylindrical portion 622 of the one or more crash collapse features 618 to the innermost surface 620 of the of the outer race 506. The chamfer portion 624 has an angle θ measured from a center line C1 of the constant velocity joint assembly 500. In accordance with an embodiment of the disclosure and as a non-limiting example, the angle θ of the chamfer portion 624 may be from approximately 1° to approximately 30°. By making the angle θ of the chamfer portion 624 of the one or more crash collapse features 618 from approximately 1° to approximately 30°, it allows the chamfer portion 624 of the one or more crash collapse features 618 to provide the resistance needed to prevent the cage 508 from collapsing prematurely during normal operation of the constant velocity joint assembly 500. As a result, it is therefore to be understood that the angle θ being from approximately 1° to approximately 30° provides a critical range needed to ensure that the cage 508 only collapses upon the application of a pre-determined amount of force during a crash condition while still allowing the constant velocity joint assembly 500 to operate normally during normal operating conditions.

As best seen in FIG. 6 of the disclosure, when the constant velocity joint assembly 500 is in a second position 626 after the vehicle (not shown) experiences a crash condition and an amount of force F1 is applied to the joint assembly 500. The force F1 drives the first shaft 502, the inner race 504, the cage 508 and the one or more torque transfer elements 510 axially toward the one or more crash collapse features 618 until at least a portion of the cage 508 is in direct contact with the one or more crash collapse features 618. When the amount of force F1 reaches a pre-determined amount, the one or more crash collapse features 618 collapses the cage 508 radially inward until the outermost diameter OD2 of the cage 508 is substantially equal to or less than the diameter D3 of the substantially cylindrical portion 622 of the one or more crash collapse features 618. Once the outermost diameter OD2 of the cage 508 is substantially equal to or less than the diameter D3 of the substantially cylindrical portion 622 of the one or more crash collapse features 618, the first shaft 502, the inner race 504, the cage 508 and/or the one or more torque transfer elements 510 are able to translate axially toward the plug member 606.

It is within the scope of this disclosure that, the first shaft 502, the inner race 504, the cage 508 and/or the one or more torque transfer elements 510 may force the plug member 606 out of engagement with the second receiving portion 604 of the outer race 506 due to the force F1 experienced by the constant velocity joint assembly 500 during the crash condition 626. As a result, it is within the scope of this disclosure that the first shaft 502, the inner race 504, the cage 508, the one or more torque transfer elements 510 and/or the plug member 606 may translate axially into the hollow portion 600 of the second shaft 594 during the crash condition 626. This allows the constant velocity joint assembly 500 to absorb at least a portion of the force F1 generated during the crash condition 626 which will aid in preventing injury to vehicle passengers and will aid in preventing damage to nearby vehicle components due to buckling. It can therefore be understood that the constant velocity joint assembly 500 will increase the overall crash safety rating of the vehicle (not shown).

Additionally, it is within the scope of this disclosure that the amount of force F1 needed to collapse the constant velocity joint assembly 500 can be customized by changing the diameter D3 of the substantially cylindrical portion 622 and/or by changing the angle θ of the chamfer portion 624 of the joint assembly 500. By increasing the diameter D3 of the substantially cylindrical portion 622 and/or reducing the angle θ of the chamfer portion 624 of the one or more crash collapse features 618, the amount of force F1 needed to collapse the constant velocity joint assembly 500 decreases. Additionally, by decreasing the diameter D3 of the substantially cylindrical portion 622 and/or increasing the angle θ of the chamfer portion 624 of the one or more crash collapse features 618, the amount of force F1 needed to collapse the constant velocity joint assembly 500 increases.

Furthermore, as best seen in FIG. 5 of the disclosure, it is to be understood that the flexible boot 558 may separate into two or more pieces or may separate from the boot can 560 due to the force F1 experienced by the constant velocity joint assembly 500 during a crash condition. As a result, it is within the scope of this disclosure that the amount of force F1 needed to collapse the constant velocity joint assembly 500 can be customized by changing the material of the flexible boot 558 and/or by changing the amount of clamping force exerted by the boot can 560 onto the flexible boot 558. By increasing the amount of clamping force exerted by the boot can 560 onto the flexible boot 558, the total amount of force needed to collapse the constant velocity joint assembly 500 can be increased. In contrast, if the amount of clamping force exerted by the boot can 560 onto the flexible boot 558 is decreased, the total amount of force needed to collapse the constant velocity joint assembly 500 can be decreased. Additionally, by increasing the ultimate tensile strength of the material of the flexible boot 558, the total amount of force needed collapse the constant velocity joint assembly 500 can be increased. In contrast, it is within the scope of this disclosure that the amount of force needed collapse the constant velocity joint assembly 500 can be decreased by decreasing the ultimate tensile strength of the material of the flexible boot 558.

Figure 7:
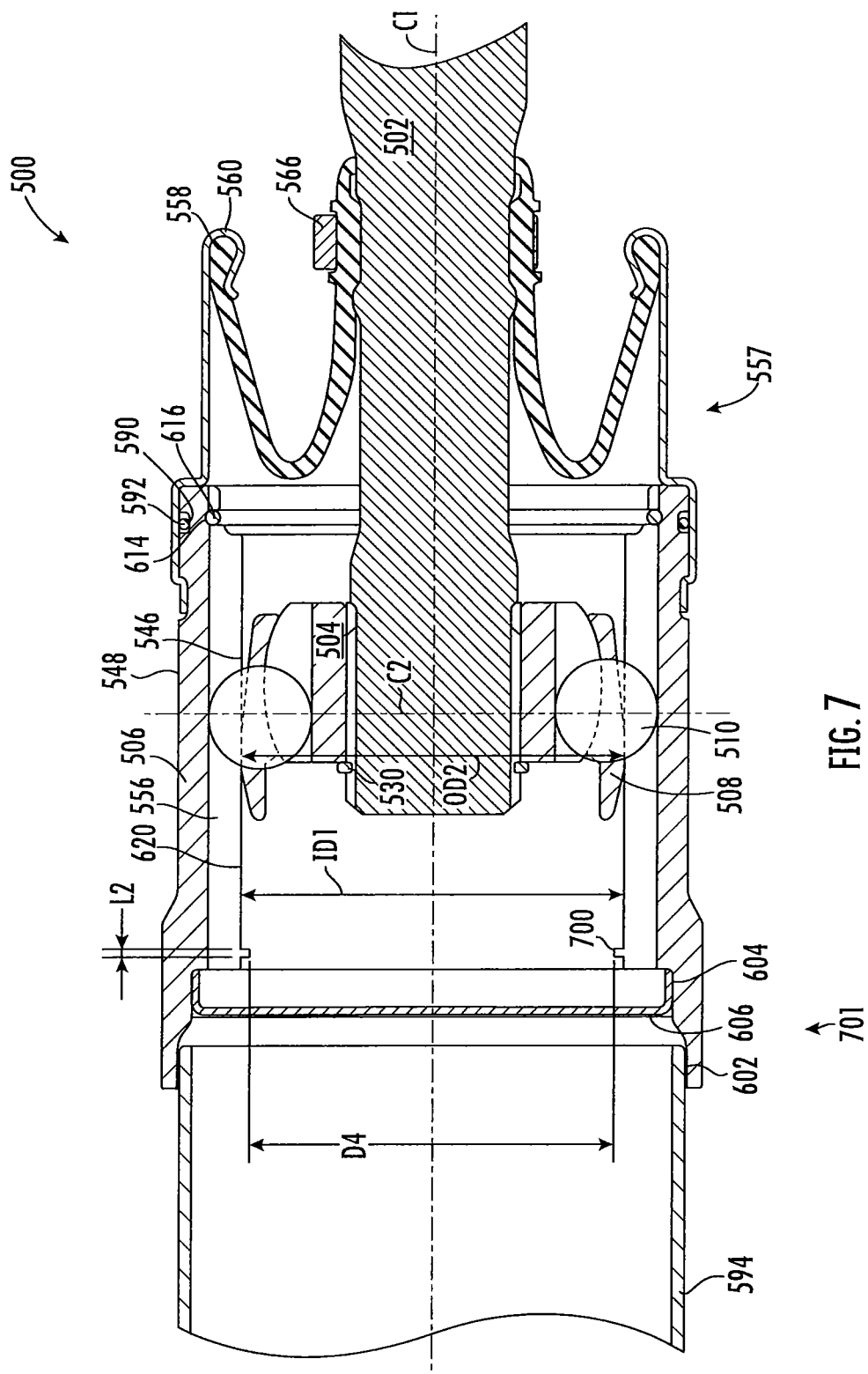
FIG. 7 is a cut-away schematic side-view of the constant velocity joint assembly illustrated in FIG. 5 having a crash collapse feature according to an alternative embodiment of the disclosure when the constant velocity joint assembly is in a first position.
Figure 8:
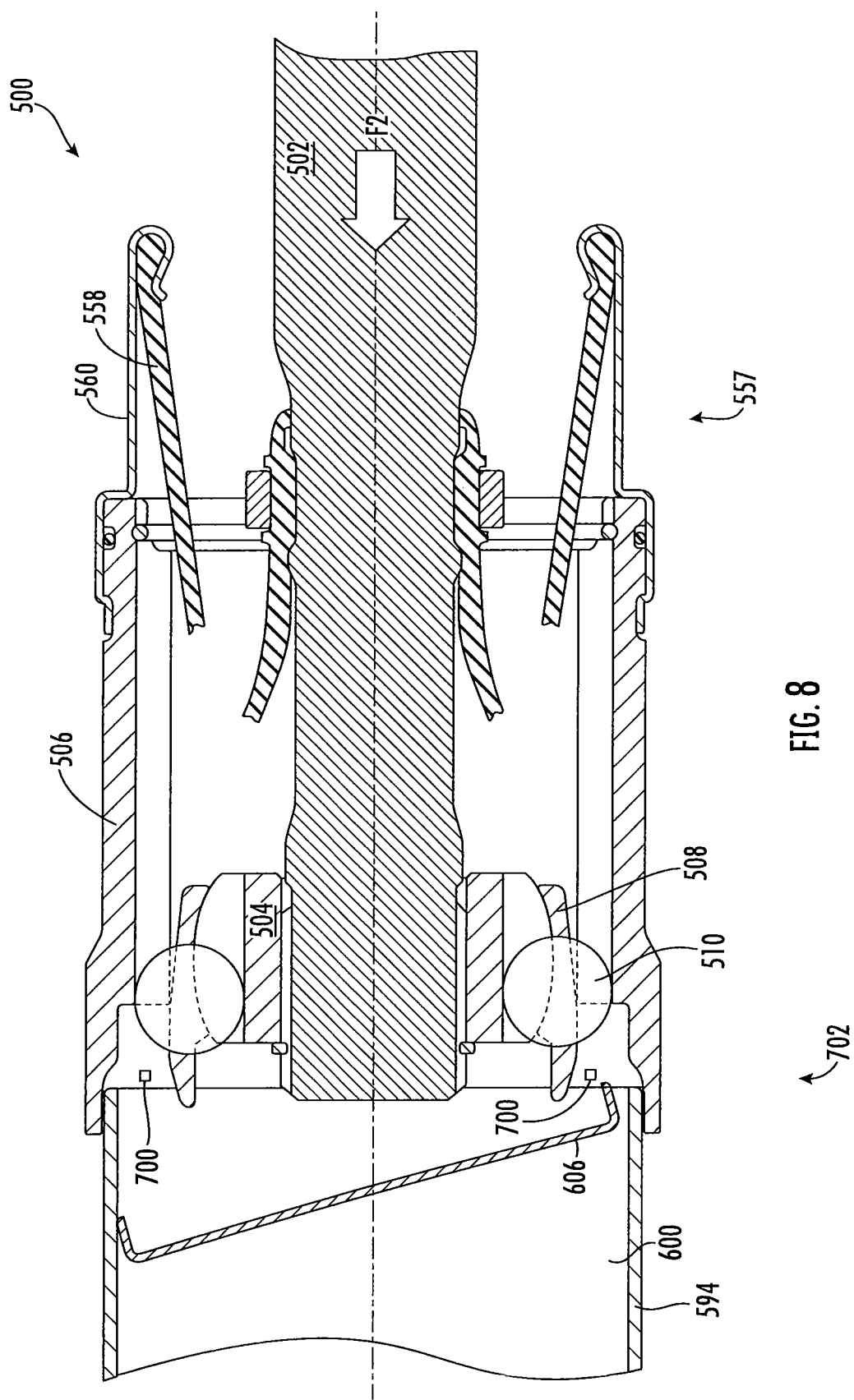
FIG. 8 is a cut-away schematic side-view of the constant velocity joint assembly illustrated in FIG. 7 in a second position.

FIGS. 7 and 8 provide a cut-away schematic side-view of the constant velocity joint assembly 500 illustrated in FIGS. 5 and 6 having one or more crash collapse features 700 according to an alternative embodiment of the disclosure. When the constant velocity joint assembly 500 is in the position illustrated in FIG. 7 of the disclosure, the constant velocity joint assembly 500 is in a first position 701. The constant velocity joint assembly 500 illustrated in FIGS. 7 and 8 are the same as the joint assembly 500 illustrated in FIGS. 5 and 6, except where specifically noted below. In accordance with the embodiment of the disclosure illustrated in FIGS. 7 and 8, the one or more crash collapse features 700 does not include the chamfer portion 624 illustrated in FIG. 5 of the disclosure.

As best seen in FIG. 7 of the disclosure, the one or more crash collapse features 700 circumferentially extend radially inward from at least a portion of the inner surface 546 of the outer race 506 of the constant velocity joint assembly 500. It is within the scope of this disclosure and as a non-limiting example that the one or more crash collapse features 700 may extend radially inward from the innermost surface 620 of the outer race 506 and may be disposed proximate to the second receiving portion 602 and/or the one or more outer race torque transfer element grooves 556 of the outer race 506. Ln accordance with this embodiment of the disclosure and as a non-limiting example, the one or more crash collapse features 700 may be substantially cylindrical in shape having a diameter D4 that is less than the innermost diameter ID1 of the one or more outer race torque transfer element grooves 556 of the outer race 506. By providing the constant velocity joint assembly 500 with one or more crash collapse features 700 in this location, it allows the inner race 504 to plunge axially relative to the outer race 506 when in operation and provides the constant velocity joint assembly 500 with a positive stopping feature preventing the inner race 504 and the cage 508 from plunging beyond a predetermined amount when in normal operation. This prevents the inner race 504 from becoming drivingly disengaged from the outer race 506 prematurely during normal operating conditions. As a result, it is to be understood that the one or more crash collapse features 700 allow the constant velocity joint assembly 500 to retain full plunging and articulation capabilities, while preventing premature disengagement of the inner race 504 and allowing the first shaft 502 to collapse within the second shaft 594 upon the occurrence of a crash condition.

In accordance with the embodiment illustrated in FIG. 7 and as a non-limiting example, the one or more crash collapse features 700 may have a length L2. As a non-limiting example, the length L2 of the one or more crash collapse features 700 may be from approximately 0 mm to approximately 25 mm or may be from approximately 1 mm to approximately 25 mm. By making the length L2 of the one or more crash collapse features 700 from approximately 1 mm to approximately 25 mm, it provides the one or more crash collapse features 700 with the strength needed to prevent the one or more crash collapse features 700 from deforming and/or fracturing prematurely during normal operation to the constant velocity joint assembly 500. As a result, it is to be understood that the length L2 being from approximately 1 mm to approximately 25 mm provides a critical range needed in order to ensure that the one or more crash collapse features 700 has the strength needed to ensure normal operation of the constant velocity joint assembly 500 during normal conditions while still allowing the first shaft 502 to collapse within the second shaft 594 upon the occurrence of a crash condition.

According to an embodiment of the disclosure and as a non-limiting example, the ratio of the outermost diameter OD2 of the cage 508 (i.e. the outer spherical diameter)/the diameter D4 of the one or more crash collapse features 700 may be from approximately 1.0002 to approximately 1.5. By providing the constant velocity joint assembly 500 with one or more crash collapse features 700 with a ratio of the outermost diameter OD2/the diameter D4 from approximately 1.0002 to approximately 1.5, it provides the one or more crash collapse features 700 with the resistance needed to allow the constant velocity joint assembly 500 to operate normally during normal operating conditions. Additionally, by providing the constant velocity joint assembly 500 with one or more crash collapse features 700 with a ratio of the outermost diameter OD2/the diameter D4 from approximately 1.0002 to approximately 1.5, it ensures that the cage 508 will only deform, fracture and/or separate the one or more crash collapse features 700 from the outer race 506 upon the application of a pre-determine amount of force during a crash condition. As a result, it is to be understood that the ratio of the outermost diameter OD2/the diameter D4 from approximately 1.0002 to approximately 1.5 provides a critical range where the one or more crash collapse features 700 act as a stopper feature during normal operating conditions but allows the one or more crash collapse features 700 to be separable from the outer race 506 during a crash condition thereby allowing the first shaft 502 to collapse into the second shaft 594.

Additionally, according to an alternative embodiment of the disclosure and as a non-limiting example, the ratio of the length L2 of the one or more crash collapse features 700/the diameter D4 of the one or more crash collapse features 700 may be from approximately 0.002 to approximately 0.5. By providing the constant velocity joint assembly 500 with one or more crash collapse features 700 with a ratio of the length L2/the diameter D4 from approximately 0.002 to approximately 0.5, it provides the one or more crash collapse features 700 with the strength needed to allow the constant velocity joint assembly 500 to operate normally during normal operating conditions. Additionally, by providing the constant velocity joint assembly 500 with one or more crash collapse features 700 with a ratio of the length L2/the diameter D4 from approximately 0.002 to approximately 0.5, it ensures that the cage 508 will only deform, fracture and/or separate the one or more crash collapse features 700 from the outer race 506 upon the application of a pre-determine amount of force during a crash condition. As a result, it is to be understood that the ratio of the length L2/the diameter D4 from approximately 0.002 to approximately 0.5 provides a critical range where the one or more crash collapse features 700 act as a stopper feature during normal operating conditions but allows the one or more crash collapse features 700 to be separable from the outer race 506 during a crash condition thereby allowing the first shaft 502 to collapse into the second shaft 594.

As best seen in FIG. 8 of the disclosure, when the constant velocity joint assembly 500 is in a second position 702 after the vehicle (not shown) experiences a crash condition and an amount of force F2 is applied to the joint assembly 500. The force F2 drives the first shaft 502, the inner race 504, the cage 508 and the one or more torque transfer elements 510 axially toward the one or more crash collapse features 700 until at least a portion of the cage 508 is in direct contact with the one or more crash collapse features 700. When the amount of force F2 reaches a pre-determined amount, the one or more torque transfer elements 510 and/or the cage 508 will apply an amount of force to the one or more crash collapse features 700 necessary to separate the one or more crash collapse features 700 from the outer race 506 of the constant velocity joint assembly 500. Once the one or more crash collapse features 700 have been severed from the outer race 506, the first shaft 502, the inner race 504, the cage 508 and/or the one or more torque transfer elements 510 are able to translate axially toward the plug member 606.

It is within the scope of this disclosure that, the first shaft 502, the inner race 504, the cage 508 and/or the one or more torque transfer elements 510 may force the plug member 606 out of engagement with the second receiving portion 604 of the outer race 506 due to the force F2 experienced by the constant velocity joint assembly 500 during the crash condition 702. As a result, it is within the scope of this disclosure that the first shaft 502, the inner race 504, the cage 508, the one or more torque transfer elements 510, the plug member 606 and/or the one or more crash collapse features 700 may translate axially into the hollow portion 600 of the second shaft 594 during the crash condition 702. This allows the constant velocity joint assembly 500 to absorb at least a portion of the force F2 generated during the crash condition 702 which will aid in preventing injury to vehicle passengers and will aid in preventing damage to nearby vehicle components due to buckling. It can therefore be understood that the constant velocity joint assembly 500 will increase the overall crash safety rating of the vehicle (not shown).

Additionally, it is within the scope of this disclosure that the amount of force F2 needed to separate the one or more crash collapse features 700 from the outer race 506 can be customized by changing the length L2 of the one or more crash collapse features 700. By increasing the length L2 of the one or more crash collapse features 700, the amount of force F2 needed to separate the one or more crash collapse features 700 from the outer race 506 of the constant velocity joint assembly 500 increases. In contrast, by decreasing the length L2 of the one or more crash collapse features 700, the amount of force F2 needed to separate the one or more crash collapse features 700 from the outer race 506 of the constant velocity joint assembly 500 decreases.

Furthermore, it within the scope of this disclosure that the amount of force F2 needed to separate the one or more crash collapse features 700 from the outer race 506 can be customized by performing one or more heat treating processes to the one or more crash collapse features 700 of the constant velocity joint assembly 500. By applying one or more heat treating processes to the one or more crash collapse features 700 of the constant velocity joint assembly 500, the amount of force F2 needed to separate the one or more crash collapse features 700 from the outer race 506 of the constant velocity joint assembly 500 increases.

Figure 9:
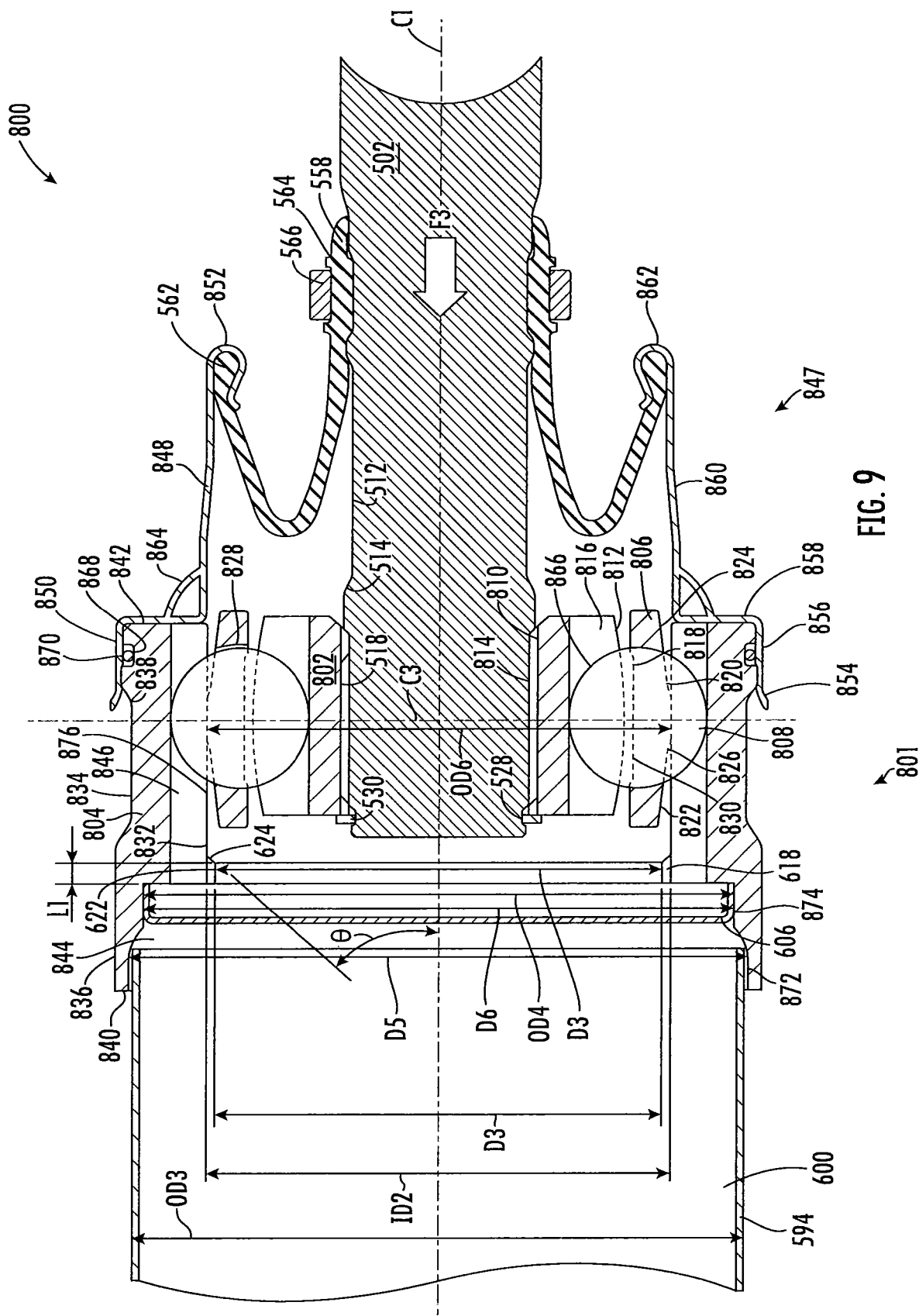
FIG. 9 is a cut-away schematic side-view of a constant velocity joint assembly according to an alternative embodiment of the disclosure having the crash collapse feature illustrated in FIGS. 5 and 6 of the disclosure when the constant velocity joint assembly is in a first position.

FIG. 9 is a cut-away schematic side-view of a constant velocity joint assembly 800 according to an alternative embodiment of the disclosure having the one or more crash collapse features 618 illustrated in FIGS. 5 and 6 of the disclosure. When the constant velocity joint assembly 800 is in the position illustrated in FIG. 9 of the disclosure, the constant velocity joint assembly 800 is in a first position 801. The constant velocity joint assembly 800 illustrated in FIG. 9 is the same as the constant velocity joint assembly 500 illustrated in FIGS. 5 and 6, except where specifically noted below. The constant velocity joint assembly 800 includes the first shaft 502, an inner race 802, an outer race 804, a cage 806 and one or more torque transfer elements 808. In accordance with an embodiment of the disclosure and as a non-limiting example, the constant velocity joint assembly 800 is a cross-groove constant velocity joint having plunging and articulation capabilities.

Extending co-axially with and drivingly connected to the first shaft 502 is the inner race 802 of the constant velocity joint assembly 800. As illustrated in FIG. 9 of the disclosure, the inner race 802 has an inner surface 810 and an outer surface 812. Circumferentially extending along at least a portion of the inner surface 810 of the inner race 802 of the constant velocity joint assembly 800 is a plurality of axially extending inner race splines 814. The plurality of axially extending inner race splines 814 are complementary to and meshingly engaged with the plurality of axially extending splines 518 on the first end portion 514 of the first shaft 502 of the constant velocity joint assembly 500.

Circumferentially extending along at least a portion of the outer surface 812 of the inner race 802 of the constant velocity joint assembly 800 is one or more inner race torque transfer element grooves 816. The one or more inner race torque transfer element grooves 816 are of a size and a shape to receive at least a portion of the one or more torque transfer elements 808 of the constant velocity joint assembly 800.

As illustrated in FIG. 9 of the disclosure, when the snap-ring 530 is disposed within the shaft snap-ring groove 528, at least a portion of the snap-ring 530 is in contact with the inner race 802 of the constant velocity joint assembly 800. As a result, the snap-ring 530 axially restrains the inner race 802 to the first end portion 514 of the first shaft 502 of the constant velocity joint assembly 800.

Interposed between the inner race 802 and the outer race 804 of the constant velocity joint assembly 800 is the cage 806. As illustrated in FIG. 9 of the disclosure, the cage 806 has an inner surface 818, an outer surface 820, a first end portion 822, a second end portion 824 and an intermediate portion 826 disposed between the first and second end portions 822 and 824 of the cage 806. Extending from the inner surface 818 to the outer surface 820 of the cage 806 is one or more torque transfer element retaining openings 828. The one or more torque transfer element retaining openings 828 in the cage 806 are of a size and shape to receive and/or retain at least a portion of one or more of the one or more torque transfer elements 808.

As illustrated in FIG. 9, of the disclosure, the intermediate portion 826 of the inner surface 818 of the cage 806 has an increased diameter portion 830. According to an embodiment of the disclosure and as a non-limiting example, the increased diameter portion 830 of the cage 806 is substantially cylindrical in shape.

In accordance with the embodiment of the disclosure illustrated in FIG. 9 and as a non-limiting example, when the joint assembly 800 is assembled, the inner race 802, the cage 806 and the one or torque transfer elements 808 have a centerline C3 that is substantially the same.

Disposed at least partially radially outboard from the first shaft 502, the inner race 802, the cage 806 and the one or more torque transfer elements 806 is the outer race 804 of the constant velocity joint assembly 800. As illustrated in FIG. 9 of the disclosure, the outer race 804 has an inner surface 832, an outer surface 834, a first end portion 836, a second end portion 838, a first end 840 and a second end 842. The inner surface 832 and the outer surface 834 of the outer race 804 defines a hollow portion 844 therein. As illustrated in FIG. 9 of the disclosure, at least a portion of the first shaft 502, the inner race 802, the cage 806 and the one or more torque transfer elements 808 are disposed within the hollow portion 844 of the outer race 804 of the constant velocity joint assembly 800.

Circumferentially extending along at least a portion of the inner surface 832 of the outer race 804 is one or more outer race torque transfer element grooves 846. The one or more outer race torque transfer element grooves 846 are of a shape to receive at least a portion of the one or more torque transfer elements 808. As a result, the one or more one or more torque transfer elements 808 drivingly connects the inner race 802 to the outer race 804 of the constant velocity joint assembly 800.

As illustrated in FIG. 9 of the disclosure, the one or more outer race torque transfer element grooves 846 have an innermost diameter ID2. It is within the scope of this disclosure and as a non-limiting example that the innermost diameter ID2 of the outer race 804 may be substantially equal to or slightly greater than an outermost diameter OD6 of the cage 806 of the constant velocity joint assembly 800.

Disposed radially outboard from the first shaft 502 of the constant velocity joint assembly 800 is the flexible boot 558. As previously discussed, the flexible boot 558 provides a flexible seal for the joint assembly 800 preventing the migration of dust, debris and moisture from the external environment into the joint assembly 800.

At least a portion of the first end portion 562 of the flexible boot 558 of a boot assembly 847 is connected to at least a portion of the outer surface 834 of the second end portion 838 of the outer race 804 of the constant velocity joint assembly 800. In accordance with the embodiment of the disclosure illustrated in FIG. 9 and as a non-limiting example, the first end portion 562 of the flexible boot 558 is connected to the outer surface 834 of the outer race 804 by using a boot can 848 having a first end portion 850 and a second end portion 852. As illustrated in FIG. 9 of the disclosure, at least a portion of the first end portion 850 of the boot can 848 of the boot assembly 847 is connected to the outer surface 834 of the second end portion 838 of the outer race 804. Additionally, as illustrated in FIG. 9 of the disclosure, at least a portion of the second end portion 852 of the boot can 848 is connected to at least a portion of the first end portion 562 of the flexible boot 558 of the constant velocity joint assemble 800. The boot can 848 aids in protecting the flexible boot 558 from damage due to impact from debris when the vehicle (not shown) is in operation. As a non-limiting example, the boot can 848 is made of substantially rigid material such as a metallic material, an aluminium alloy, a steel alloy, a carbon fibre material or a composite material.

In accordance with the embodiment of the disclosure illustrated in FIG. 9 and as a non-limiting example, the boot can 848 includes, in axial order from the first to the second end portion 850 and 852 of the boot can 848, a radially outward extending portion 854, a first substantially horizontal portion 856, a radially inward extending portion 858, a second substantially horizontal portion 860 and a hook-shaped portion 862. As illustrated in FIG. 9 of the disclosure, at least a portion of the first substantially horizontal portion 856 of the boot can 848 is connected to at least a portion of the outer surface 834 of the second end portion 838 of the outer race 804.

At least a portion of the radially inward extending portion 858 of the boot can 848 is in direct contact with at least a portion of the second end 842 of the outer race 804. The radially inward extending portion 858 of the boot can 848 acts as a stopper to prevent the boot can 848 from extending along the outer surface 834 of the second end portion 838 of the outer race 804 beyond a pre-determined distance.

In accordance with an embodiment of the disclosure and as a non-limiting example, the boot can 848 further includes one or more torque transfer element stopper portions 864 that are substantially arcuate in shape. As illustrated in FIG. 9 of the disclosure, the one or more torque transfer element stopper portions 864 of the boot can 848 have a shape that is complementary to an outer surface 866 of the one or more torque transfer elements 808 of the constant velocity joint assembly 800. Additionally, as illustrated in FIG. 9 of the disclosure, an end of the one or more torque transfer element stopper portions 864 are directly connected to the radially inward extending portion 858 of the boot can 848. Furthermore, an end of the one or more torque transfer element stopper portions 864 opposite the radially inward extending portion 858 is directly connected to the second substantially horizontal portion 860 of the boot can 848. In accordance with this embodiment of the disclosure, the one or more torque transfer element stopper portions 864 are disposed adjacent to the one or more outer race torque transfer element grooves 846. When the constant velocity joint assembly 800 is articulated to a maximum articulation angle (not shown), one or more of the one or more torque transfer elements 808 come into direct contact with the one or more torque transfer element stopper portions 864 of the boot can 848. Additionally, when the first shaft 502, the inner race 802, the cage 806 and/or the one or more torque transfer elements 808 translate axially away from the second shaft 592, one or more of the one or more torque transfer elements 808 come into direct contact with the one or more torque transfer element stopper portions 864 of the boot can 848. As a result, the constant velocity joint assembly 800 is prevented from articulating beyond the maximum articulation angle (not shown) and axially moving beyond a pre-determined distance away from the second shaft 594 thereby improving the overall life and durability of the constant velocity joint assembly 800.

Circumferentially extending along at least a portion of the outer surface 834 of the second end portion 838 of the outer race 804 is an O-ring groove 868. The O-ring groove 868 on the outer surface 834 of the second end portion 838 of the outer race 804 is of a size and a shape to receive at least a portion of an O-ring 870 disposed therein. The O-ring 870 provides a sealing engagement between the boot can 848 and the outer race 804 of the constant velocity joint assembly 800.

Finally, as illustrated in FIG. 9 of the disclosure, at least a portion of the first end portion 562 of the flexible boot 558 is disposed within and retained by the hook-shaped portion 862 of the boot can 848.

In accordance with an embodiment of the disclosure and as a non-limiting example, at least a portion of the second shaft 594 is received within a first receiving portion 872 of the outer race 804. As illustrated in FIG. 9 of the disclosure, the first receiving portion 872 circumferentially extends along at least a portion of the inner surface 832 of the outer race 804 and extends axially inward from the first end 840 of the outer race 804 of the constant velocity joint assembly 800. It is within the scope of this disclosure and as a non-limiting example that the first receiving portion 872 of the outer race 804 may have a diameter D5 that is substantially equal to or slightly greater than the outer diameter OD3 of the second shaft 594. Additionally, it is within the scope of this disclosure and as a non-limiting example that the first receiving portion 872 of the outer race 804 may have a diameter D5 that is slightly less than the outer diameter OD3 of the second shaft 594 so as to provide a press-fit. As a non-limiting example, at least a portion of the first end portion 836 of the outer race 804 may be integrally connected to at least a portion of the second shaft 594 by using one or more welds, one or more mechanical fasteners, a threaded connection and/or a splined connection.

Interposed between the first receiving portion 872 and the one or more outer race torque transfer element grooves 846 is a second receiving portion 874. As illustrated in FIG. 9 of the disclosure, the second receiving portion 874 circumferentially extends along at least a portion of the inner surface 832 of the first end portion 836 of the outer race 804 between the first receiving portion 872 and the one or more outer race torque transfer element grooves 846. The second receiving portion 874 has a diameter D6 that is smaller than the diameter D5 of the first receiving portion 872. Additionally, the diameter D6 of the second receiving portion 874 is greater than the innermost diameter ID2 of the one or more outer race torque transfer element grooves 846.

The second receiving portion 874 of the outer race 804 is of a size and shape to receive and/or retain the plug member 606. As illustrated in FIG. 9 of the disclosure the diameter D6 of the second receiving portion 874 is substantially equal to, slightly less than or slightly greater than the outer diameter OD4 of the plug member 606 of the constant velocity joint assembly 800. According to an embodiment of the disclosure and as a non-limiting example, the plug member 606 may be press-fit into the second receiving portion 874 of the constant velocity joint assembly 800. In accordance with an alternative embodiment of the disclosure and as a non-limiting example, the plug member 606 may be secured within the second receiving portion 874 of the outer race 804 by using one or more welds, such as but not limited to one or more tack welds. As previously discussed, plug member 606 aids in preventing the migration of one or more lubrication fluids (not shown) from outside the constant velocity joint assembly 800 thereby ensuring the joint 800 has proper lubrication when in operation.

As illustrated in FIG. 9 of the disclosure, the one or more crash collapse features 618 circumferentially extend radially inward from at least a portion of the inner surface 832 of the outer race 804 of the constant velocity joint assembly 800. It is within the scope of this disclosure and as a non-limiting example that the one or more crash collapse features 618 may circumferentially extend inward from at least a portion of an innermost surface 876 of the outer race 804 and may be disposed proximate to the second receiving portion 874 and/or the one or more outer race torque transfer element grooves 846 of the outer race 804. In accordance with this embodiment of the disclosure and as a non-limiting example, the diameter D3 of the substantially cylindrical portion 622 of the one or more crash collapse features 618 may be less than the innermost diameter ID2 of the one or more outer race torque transfer element grooves 846 of the outer race 804. By providing the constant velocity joint assembly 800 with one or more crash collapse features 618 in this location, it allows the inner race 802 to plunge axially relative to the outer race 804 when in operation and provides the constant velocity joint assembly 800 with a positive stopping feature preventing the inner race 802 and the cage 806 from plunging beyond a pre-determined amount when in normal operation. This prevents the inner race 802 from becoming drivingly disengaged from the outer race 804 prematurely during normal operating conditions. As a result, it is to be understood that the one or more crash collapse features 618 allow the constant velocity joint assembly 800 to retain full plunging and articulation capabilities, while preventing premature disengagement of the inner race 802 and allowing the first shaft 502 to collapse within the second shaft 594 upon the occurrence of a crash condition.

According to an embodiment of the disclosure and as a non-limiting example, the ratio of the outermost diameter OD6 of the cage 806 (i.e. the outer spherical diameter)/the diameter D3 of the substantially cylindrical portion 622 of the one or more crash collapse features 618 may be from approximately 1.0002 to approximately 1.5. By providing the constant velocity joint assembly 800 with one or more crash collapse features 618 with a ratio of the outermost diameter OD6/the diameter D3 from approximately 1.0002 to approximately 1.5, it provides the one or more crash collapse features 618 with the resistance needed to allow the constant velocity joint assembly 800 to operate normally during normal operating conditions. Additionally, by providing the constant velocity joint assembly 800 with one or more crash collapse features 618 with a ratio of the outermost diameter OD6/the diameter D3 from approximately 1.0002 to approximately 1.5, it ensures that the cage 806 will only collapse upon application of a pre-determine amount of force during a crash condition. As a result, it is to be understood that the ratio of the outermost diameter OD6/the diameter D3 from approximately 1.0002 to approximately 1.5 provides a critical range where the one or more crash collapse features 618 act as a stopper feature during normal operating conditions but allows the one or more crash collapse features 618 to collapse the cage 806 during a crash condition allowing the first shaft 502 to collapse within the second shaft 594.

When the constant velocity joint assembly 800 experiences a crash condition (not shown), an amount of force F3 is applied to the joint assembly 800. The force F3 drives the first shaft 502, the inner race 802, the cage 806 and the one or more torque transfer elements 808 axially toward the one or more crash collapse features 618 until at least a portion of the cage 806 is in direct contact with the one or more crash collapse features 618. When the amount of force F3 reaches a pre-determined amount, one or more crash collapse features 618 collapses the cage 806 radially inward until the outermost diameter OD6 of the cage 806 is substantially equal to or less than the diameter D3 of the substantially cylindrical portion 622 of the one or more crash collapse features 618. Once the outermost diameter OD6 of the cage 806 is substantially equal to or less than the diameter D3 of the substantially cylindrical portion 622 of the one or more crash collapse features 618, the first shaft 502, the inner race 802, the cage 806 and/or the one or more torque transfer elements 808 are able to translate axially toward the plug member 606.

It is within the scope of this disclosure that, the first shaft 502, the inner race 802, the cage 806 and/or the one or more torque transfer elements 808 may force the plug member 606 out of engagement with the second receiving portion 874 of the outer race 804 due to the force F3 experienced by the constant velocity joint assembly 800 during the crash condition (not shown). As a result, it is within the scope of this disclosure that the first shaft 502, the inner race 802, the cage 806, the one or more torque transfer elements 808 and/or the plug member 606 may translate axially into the hollow portion 600 of the second shaft 594 during the crash condition (not shown). This allows the constant velocity joint assembly 800 to absorb at least a portion of the force F3 generated during the crash condition (not shown) which will aid in preventing injury to vehicle passengers and will aid in preventing damage to nearby vehicle components due to buckling. It can therefore be understood that the constant velocity joint assembly 800 will increase the overall crash safety rating of the vehicle (not shown).

Figure 10:
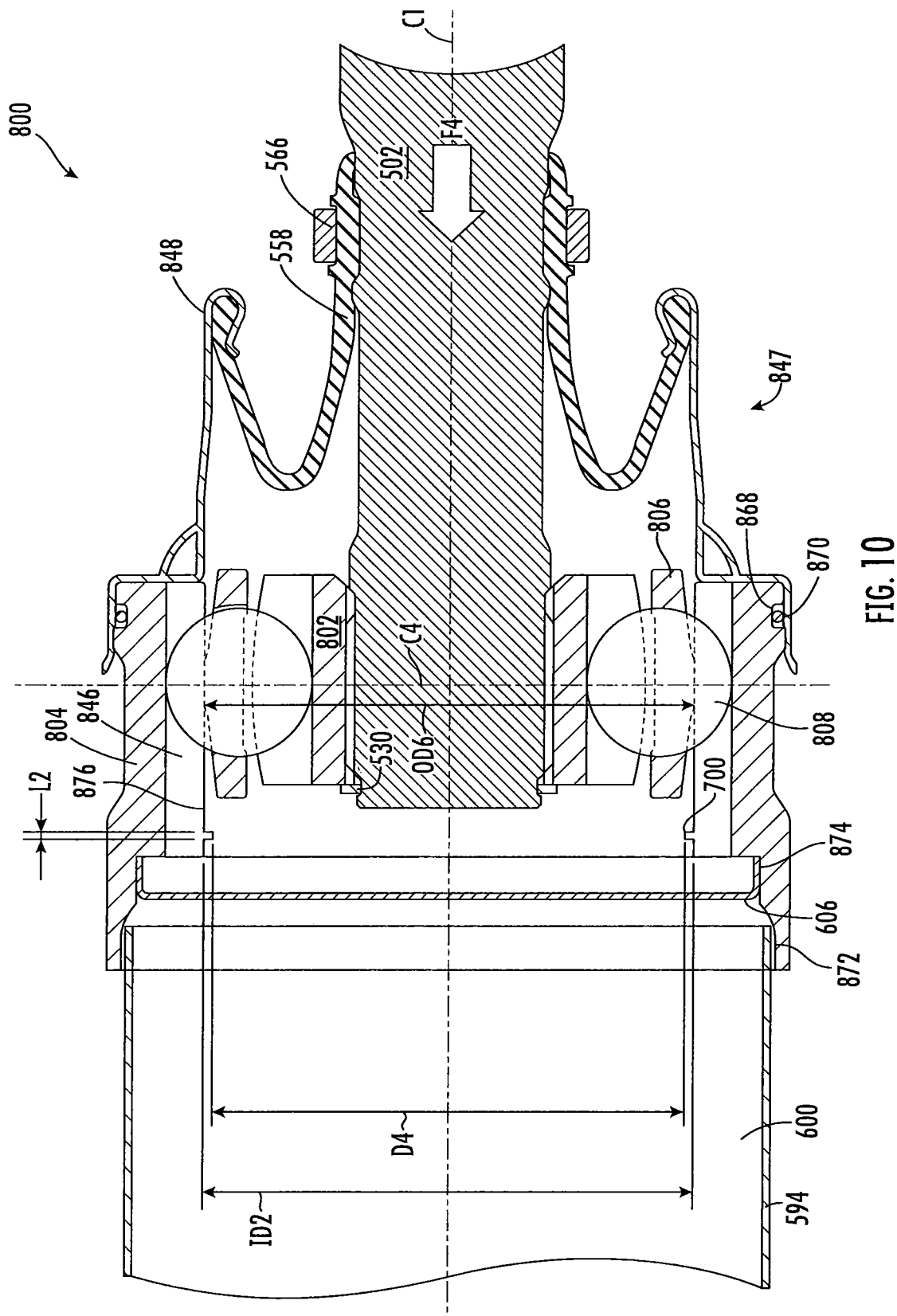
FIG. 10 is a cut-away schematic side-view of the constant velocity joint assembly illustrated in FIG. 9 having the crash collapse feature according to the embodiment illustrated in FIGS. 7 and 8 of the disclosure when the constant velocity joint assembly is in a first position.

FIG. 10 is a cut-away schematic side-view of the constant velocity joint assembly 800 illustrated in FIG. 9 having the one or more crash collapse features 700 according to the embodiment illustrated in FIGS. 7 and 8 of the disclosure. When the constant velocity joint assembly 800 is in the position illustrated in FIG. 10 of the disclosure, the constant velocity joint assembly 800 is in a first position 880. The constant velocity joint assembly 800 illustrated in FIG. 10 of the disclosure is the same of the constant velocity joint assembly 800 illustrated in FIG. 9, except where specifically noted below. As best seen in FIG. 10 and as a non-limiting example, the one or more crash collapse features 700 circumferentially extend radially inward from at least a portion of the inner surface 832 of the outer race 804 of the constant velocity joint assembly 800. It is within the scope of this disclosure and as a non-limiting example that the one or more crash collapse features 700 may circumferentially extend inward from at least a portion of the innermost surface 876 of the outer race 804 and may be disposed proximate to the second receiving portion 874 and/or the one or more outer race torque transfer element grooves 846 of the outer race 804. In accordance with this embodiment of the disclosure and as a non-limiting example, the diameter D4 of the one or more crash collapse features 700 may be less than the innermost diameter ID2 of the one or more outer race torque transfer element grooves 846 of the outer race 804. By providing the constant velocity joint assembly 800 with one or more crash collapse features 700 in this location, it allows the inner race 802 to plunge axially relative to the outer race 804 when in operation and provides the constant velocity joint assembly 800 with a positive stopping feature preventing the inner race 802 and the cage 806 from plunging beyond a pre-determined amount when in normal operation. This prevents the inner race 802 from becoming drivingly disengaged from the outer race 804 prematurely during normal operating conditions. As a result, it is to be understood that the one or more crash collapse features 700 allows the constant velocity joint assembly 800 to retain full plunging and articulation capabilities, while preventing premature disengagement of the inner race 802 and allowing the first shaft 502 to collapse within the second shaft 594 upon the occurrence of a crash condition.

When the constant velocity joint assembly 800 experiences a crash condition (not shown), an amount of force F4 is applied to the joint assembly 800. The force F4 drives the first shaft 502, the inner race 802, the cage 806 and the one or more torque transfer elements 808 axially toward the one or more crash collapse features 700 until at least a portion of the cage 806 is in direct contact with the one or more crash collapse features 700. When the amount of force F4 reaches a pre-determined amount, the one or more torque transfer elements 808 and/or the cage 806 will apply an amount of force to the one or more crash collapse features 700 necessary to separate the one or more crash collapse features 700 from the outer race 804 of the constant velocity joint assembly 800. Once the one or more crash collapse features 700 has been severed from the outer race 804, the first shaft 502, the inner race 802, the cage 806 and/or the one or more torque transfer elements 808 are able to translate axially toward the plug member 606.

It is within the scope of this disclosure that, the first shaft 502, the inner race 802, the cage 806 and/or the one or more torque transfer elements 808 may force the plug member 606 out of engagement with the second receiving portion 874 of the outer race 804 due to the force F4 experienced by the constant velocity joint assembly 800 during the crash condition (not shown). As a result, it is within the scope of this disclosure that the first shaft 502, the inner race 802, the cage 806, the one or more torque transfer elements 808, the plug member 606 and/or the one or more crash collapse features 700 may translate axially into the hollow portion 600 of the second shaft 594 during the crash condition (not shown). This allows the constant velocity joint assembly 800 to absorb at least a portion of the force F4 generated during the crash condition (not shown) which will aid in preventing injury to vehicle passengers and will aid in preventing damage to nearby vehicle components due to buckling. It can therefore be understood that the constant velocity joint assembly 800 will increase the overall crash safety rating of the vehicle (not shown).

In accordance with an embodiment of the disclosure and as a non-limiting example, the ratio of the outermost diameter OD6 of the cage 806 (i.e. the outer spherical diameter)/the diameter D4 of the one or more crash collapse features 700 may be from approximately 1.0002 to approximately 1.5. By providing the constant velocity joint assembly 800 with one or more crash collapse features 700 with a ratio of the outermost diameter OD6/the diameter D4 from approximately 1.0002 to approximately 1.5, it provides the one or more crash collapse features 700 with the resistance needed to allow the constant velocity joint assembly 800 to operate normally during normal operating conditions. Additionally, by providing the constant velocity joint assembly 800 with one or more crash collapse features 700 with a ratio of the outermost diameter OD6/the diameter D4 from approximately 1.0002 to approximately 1.5, it ensures that the cage 806 will only deform, fracture and/or separate the one or more crash collapse features 700 from the outer race 804 upon the application of a pre-determine amount of force during a crash condition. As a result, it is to be understood that the ratio of the outermost diameter OD6/the diameter D4 from approximately 1.0002 to approximately 1.5 provides a critical range where the one or more crash collapse features 700 act as a stopper feature during normal operating conditions but allows the crash collapse feature 700 to be separable from the outer race 804 during a crash condition thereby allowing the first shaft 502 to collapse into the second shaft 594.

Figure 11:
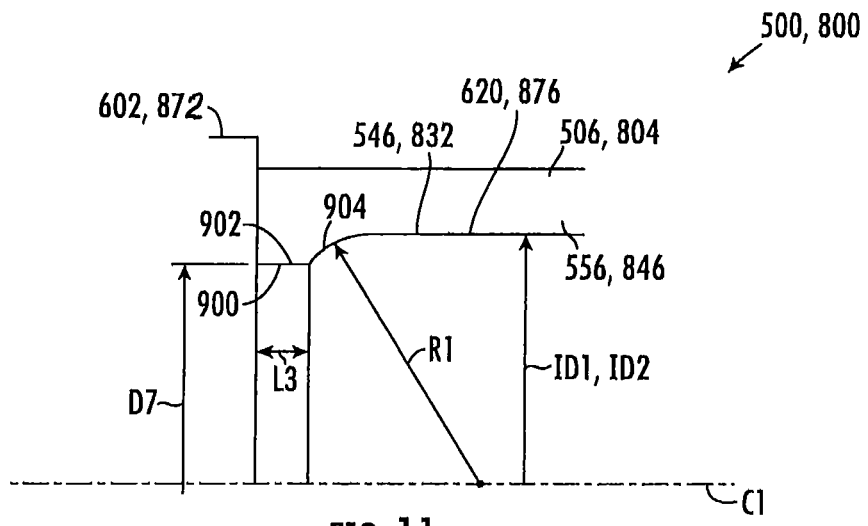
FIG. 11 is a cut-away schematic side-view of a portion of the constant velocity joint assemblies illustrated in FIGS. 5, 6 and 9 having a crash collapse feature according to an alternative embodiment of the disclosure.

FIG. 11 is a cut-away schematic side-view of a portion of a constant velocity joint assembly having one or more crash collapse features 900 according to an alternative embodiment of the disclosure. The one or more crash collapse features 900 illustrated in FIG. 11 are the same as the one or more crash collapse features 618 illustrated in FIGS. 5, 6 and 9, except where specifically noted below. In accordance with the embodiment of the disclosure illustrated in FIG. 11, the one or more crash collapse features 900 do not include the chamfer portion 624 illustrated in FIGS. 5, 6 and 9 of the disclosure. It is within the scope of this disclosure, that the constant velocity joint assembly illustrated in FIG. 11 may be the constant velocity joint assembly 500 illustrated in FIGS. 5, 6 and 9 or the constant velocity joint assembly 800 illustrated in FIGS. 7, 8 and 10 of the disclosure.

As best seen in FIG. 11 of the disclosure and as a non-limiting example, the one or more crash collapse features 900 circumferentially extend radially inward form at least a portion of the inner surface 546 or 823 of the outer race 506 or 804 of the constant velocity joint assembly 500 or 800. It is within the scope of this disclosure and as a non-limiting example that the one or more crash collapse features 900 may circumferentially extend from at least a portion of the innermost surface 620 of 876 of the outer race 506 or 804 and directly adjacent to the first receiving portion 602 or 872 outer race 506 or 804. By providing the constant velocity joint assembly 500 or 800 with one or more crash collapse features 900 in this location, it allows the inner race 504 or 802 to plunge axially relative to the outer race 506 or 804 when in operation and provides the constant velocity joint assembly 500 or 800 with a positive stopping feature preventing the inner race 504 or 802 and the cage 506 or 806 from plunging beyond a pre-determined amount when in normal operation. This prevents the inner race 504 or 802 from becoming drivingly disengaged from the outer race 506 or 804 prematurely during normal operating conditions. As a result, it is to be understood that the one or more crash collapse features 900 allow the constant velocity joint assembly 500 or 800 to retain full plunging and articulation capabilities, while preventing premature disengagement of the inner race 504 or 802 and allowing the first shaft 502 to collapse within the second shaft 594 upon the occurrence of a crash condition.

According to an embodiment of the disclosure and as a non-limiting example, the one or more crash collapse features 900 may include a substantially cylindrical portion 902 and a radiused portion 904. It is within the scope of this disclosure that the substantially cylindrical portion 622 of the one or more crash collapse features 618 illustrated in FIGS. 5, 6 and 9 are the same as the substantially cylindrical portion 902 of the one or more crash collapse features 900 illustrated in FIG. 11. As a result, the substantially cylindrical portion 902 has a diameter D7 that is less than the innermost diameter ID1 or ID2 of the one or more outer race torque transfer element grooves 556 or 832 on the inner surface 546 or 832 of the outer race 506 or 804. Furthermore, as illustrated in FIG. 11 of the disclosure, the substantially cylindrical portion 902 of the one or more crash collapse features 900 may have a length L3. As a non-limiting example, the length L3 of the substantially cylindrical portion 902 of the one or more crash collapse features 900 may be from approximately 0 to 25 mm or may be from approximately 1 mm to approximately 25 mm By making the length L3 of the one or more crash collapse features 900 from approximately 1 mm to approximately 25 mm, it provides the one or more crash collapse features 900 with the strength needed to prevent the one or more crash collapse features 900 from deforming and/or fracturing prematurely during normal operation to the constant velocity joint assembly 500 or 800. As a result, it is to be understood that the length L3 being from approximately 1mm to approximately 25 mm provides a critical range needed in order to ensure that the one or more crash collapse features 900 have the strength needed to ensure normal operation of the constant velocity joint assembly 500 or 800 during normal conditions while still allowing the first shaft 502 to collapse within the second shaft 594 upon the occurrence of a crash condition.

In accordance with an embodiment of the disclosure and as a non-limiting example, the ratio of the outermost diameter OD2 or OD6 of the cage 508 or 806 (i.e. the outer spherical diameter)/the diameter D7 of the one or more crash collapse features 900 may be from approximately 1.0002 to approximately 1.5. By providing the constant velocity joint assembly 500 or 800 with one or more crash collapse features 900 with a ratio of the outermost diameter OD2 or OD6/the diameter D7 from approximately 1.0002 to approximately 1.5, it provides the one or more crash collapse features 900 with the resistance needed to allow the constant velocity joint assembly 500 or 800 to operate normally during normal operating conditions. Additionally, by providing the constant velocity joint assembly 500 or 800 with one or more crash collapse features 900 with a ratio of the outermost diameter OD2 or OD6/the diameter D7 from approximately 1.0002 to approximately 1.5, it ensures that the cage 508 or 806 will only collapse upon application of a pre-determine amount of force during a crash condition. As a result, it is to be understood that the ratio of the outermost diameter OD2 or OD6/the diameter D7 from approximately 1.0002 to approximately 1.5 provides a critical range where the one or more crash collapse features 900 act as a stopper feature during normal operating conditions but allows the one or more crash collapse features 900 to collapse the cage 508 or 806 during a crash condition allowing the first shaft 502 to collapse within the second shaft 594.

According to an alternative embodiment of the disclosure and as a non-limiting example, the ratio of the length L3 of the substantially cylindrical portion 902/the diameter D7 of the substantially cylindrical portion 902 of the one or more crash collapse features 900 may be from approximately 0.002 to approximately 0.5. By providing a constant velocity joint assembly 500 or 800 with a ratio of the length L3/the diameter D7 from approximately 0.002 to approximately 0.5, it provides the one or more crash collapse features 900 with the strength needed to allow the constant velocity joint assembly 500 or 800 to operate normally during normal operating conditions. Additionally, by providing the constant velocity joint assembly 500 or 800 with one or more crash collapse features 900 with a ratio of the length L3/the diameter D7 from approximately 0.002 to approximately 0.5, it ensures that the cage 508 or 806 will only collapse upon application of a pre-determined amount of force during a crash condition. As a result, it is to be understood that the ratio of the length L3/the diameter D7 from approximately 0.002 to approximately 0.5 provides a critical range where the one or more crash collapse features 900 act as a stopper feature during normal operating conditions but allows the one or more crash collapse features 900 to collapse the cage 508 or 806 during a crash condition allowing the first shaft 502 to collapse within the second shaft 594.

In accordance with the embodiment of the disclosure illustrated in FIG. 11, the radiused portion 904 of the one or more crash collapse features 900 may replace the chamfer portion 624 illustrated in FIGS. 5, 6 and 9 of the disclosure. The radiused portion 904 of the one or more crash collapse features 900 connects the substantially cylindrical portion 902 of the one or more crash collapse features 900 to the innermost surface 620 or 876 of outer race 506 or 804 of the constant velocity joint assembly 500 or 800. As illustrated in FIG. 11 of the disclosure, the radiused portion 904 has a radius R1 that is measured from the centerline C1 of the constant velocity joint assembly 500 of 800. By providing the one or more crash collapse features 900 with a radiused portion 904, it provides a more effective method of collapsing the cage 508, 806 of the constant velocity joint assembly 500 or 800. This is achieved by increasing the magnitude of the radial compressive force exerted onto the cage 508 or 806 by the one or more crash collapse features 900 during a crash condition. As a result, it is to be understood that the radiused portion 904 of the one or more crash collapse features 900 are able to apply an increased amount of radially compressive force onto the cage 508 or 806 in a more cost effective and space saving size.

It is within the scope of this disclosure and as a non-limiting example that the radius R1 of the radiused portion 904 of the constant velocity joint assembly 500 or 800 may be determined based on the innermost diameter ID1 or ID2 of the one or more outer race torque transfer element grooves 556 or 846. As a non-limiting example, the radius R1 of the radiused portion 904 of the one or more crash collapse features 900 may be approximately one half of the innermost diameter ID1 or ID2 of the one or more outer race torque transfer element grooves 556 or 846 of the constant velocity joint assembly 500 or 800.

Figure 12:
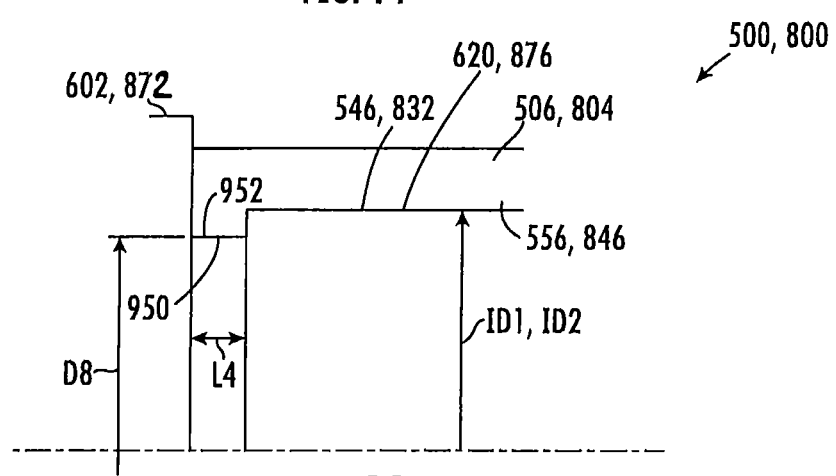
FIG. 12 is a cut-away schematic side-view of a portion of the constant velocity joint assemblies illustrated in FIGS. 5, 6 and 9 having a crash collapse feature according to a further embodiment of the disclosure.

FIG. 12 is a cut-away schematic side-view of a portion of a constant velocity joint assembly having one or more crash collapse features 950 according to an alternative embodiment of the disclosure. The one or more crash collapse features 950 illustrated in FIG. 12 are the same as the one or more crash collapse features 618 and 900 illustrated in FIGS. 5, 6, 9 and 11, except where specifically noted below. In accordance with the embodiment of the disclosure illustrated in FIG. 12, the one or more crash collapse features 950 do not include the chamfer portion 624 illustrated in FIGS. 5, 6 and 9 or the radiused portion 902 illustrated in FIG. 11 of the disclosure. It is within the scope of this disclosure, that the constant velocity joint assembly illustrated in FIG. 12 may be the constant velocity joint assembly 500 illustrated in FIGS. 5, 6 and 9 or the constant velocity joint assembly 800 illustrated in FIGS. 7, 8 and 10 of the disclosure.

As best seen in FIG. 12 of the disclosure and as a non-limiting example, the one or more crash collapse features 950 circumferentially extend radially inward form at least a portion of the inner surface 546 or 823 of the outer race 506 or 804 of the constant velocity joint assembly 500 or 800. It is within the scope of this disclosure and as a non-limiting example that the one or more crash collapse features 950 may circumferentially extend from at least a portion of the innermost surface 620 of 876 of the outer race 506 or 804 and directly adjacent to the first receiving portion 602 or 874 outer race 506 or 804. By providing the constant velocity joint assembly 500 or 800 with one or more crash collapse features 950 in this location, it allows the inner race 504 or 802 to plunge axially relative to the outer race 506 or 804 when in operation and provides the constant velocity joint assembly 500 or 800 with a positive stopping feature preventing the inner race 504 or 802 and the cage 506 or 806 from plunging beyond a pre-determined amount when in normal operation. This prevents the inner race 504 or 802 from becoming drivingly disengaged from the outer race 506 or 804 prematurely during normal operating conditions. As a result, it is to be understood that the one or more crash collapse features 950 allow the constant velocity joint assembly 500 or 800 to retain full plunging and articulation capabilities, while preventing premature disengagement of the inner race 504 or 802 and allowing the first shaft 502 to collapse within the second shaft 594 upon the occurrence of a crash condition.

The constant velocity joint assembly 500 or 800 illustrated in FIG. 12 of the disclosure, includes only a substantially cylindrical portion 952. It is within the scope of this disclosure that the substantially cylindrical portion 952 of the one or more crash collapse features 950 illustrated in FIG. 12 are the same as the substantially cylindrical portions 622 and 902 of the one or more crash collapse features 618 and 900 illustrated in FIGS. 5, 6, 9 and 11. As a result, the substantially cylindrical portion 952 has a diameter D8 that is less than the innermost diameter ID1 or ID2 of the one or more outer race torque transfer element grooves 556 or 832 on the inner surface 546 or 832 of the outer race 506 or 804. Furthermore, as illustrated in FIG. 12 of the disclosure, the substantially cylindrical portion 952 of the one or more crash collapse features 950 may have a length L4. As a non-limiting example, the length L4 of the substantially cylindrical portion 952 of the one or more crash collapse features 950 may be from approximately 0 to 25 mm or may be from approximately 1 mm to approximately 25 mm. By making the length L4 of the one or more crash collapse features 950 from approximately 1 mm to approximately 25 mm, it provides the one or more crash collapse features 950 with the strength needed to prevent the one or more crash collapse features 950 from deforming and/or fracturing prematurely during normal operation to the constant velocity joint assembly 500 or 800. As a result, it is to be understood that the length L4 being from approximately 1 mm to approximately 25 mm provides a critical range needed in order to ensure that the one or more crash collapse features 950 have the strength needed to ensure normal operation of the constant velocity joint assembly 500 or 800 during normal conditions while still allowing the first shaft 502 to collapse within the second shaft 594 upon the occurrence of a crash condition.

In accordance with an embodiment of the disclosure and as a non-limiting example, the ratio of the outermost diameter OD2 or OD6 of the cage 508 or 806 (i.e. the outer spherical diameter)/the diameter D8 of the one or more crash collapse features 950 may be from approximately 1.0002 to approximately 1.5. By providing the constant velocity joint assembly 500 or 800 with one or more crash collapse features 950 with a ratio of the outermost diameter OD2 or OD6/the diameter D8 from approximately 1.0002 to approximately 1.5, it provides the one or more crash collapse features 950 with the resistance needed to allow the constant velocity joint assembly 500 or 800 to operate normally during normal operating conditions. Additionally, by providing the constant velocity joint assembly 500 or 800 with one or more crash collapse features 950 with a ratio of the outermost diameter OD2 or OD6/the diameter D8 from approximately 1.0002 to approximately 1.5, it ensures that the cage 508 or 806 will only collapse upon application of a pre-determine amount of force during a crash condition. As a result, it is to be understood that the ratio of the outermost diameter OD2 or OD6/the diameter D8 from approximately 1.0002 to approximately 1.5 provides a critical range where the one or more crash collapse features 950 act as a stopper feature during normal operating conditions but allows the one or more crash collapse features 950 to collapse the cage 508 or 806 during a crash condition allowing the first shaft 502 to collapse within the second shaft 594.

According to an alternative embodiment of the disclosure and as a non-limiting example, the ratio of the length L4 of the substantially cylindrical portion 952/the diameter D8 of the substantially cylindrical portion 952 of the one or more crash collapse features 950 may be from approximately 0.002 to approximately 0.5. By providing a constant velocity joint assembly 500 or 800 with a ratio of the length L4/the diameter D8 from approximately 0.002 to approximately 0.5, it provides one or more crash collapse features 950 with the strength needed to allow the constant velocity joint assembly 500 or 800 to operate normally during normal operating conditions. Additionally, by providing the constant velocity joint assembly 500 or 800 with one or more crash collapse features 950 with a ratio of the length L4/the diameter D8 from approximately 0.002 to approximately 0.5, it ensures that the cage 508 or 806 will only collapse upon application of a pre-determined amount of force during a crash condition. As a result, it is to be understood that the ratio of the length L4/the diameter D8 from approximately 0.002 to approximately 0.5 provides a critical range where the one or more crash collapse features 950 act as a stopper feature during normal operating conditions but allows the one or more crash collapse features 950 to collapse the cage 508 or 806 during a crash condition allowing the first shaft 502 to collapse within the second shaft 594.

It is therefore within the scope of this disclosure that the substantially cylindrical portion 952 of the one or more crash collapse features 950 alone can be used to collapse the cage 508 or 806 radially inward until the outermost diameter OD2 or OD6 of the cage 508 or 806 is substantially equal to or less than the diameter D8 of the substantially cylindrical portion 952 of the one or more crash collapse features 950.

Figure 13:
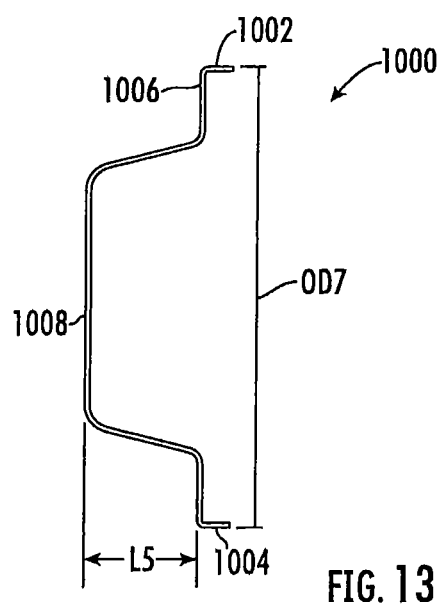
FIG. 13 is a cut-away schematic side-view of the plug member illustrated in FIGS. 5-10 according to an alternative embodiment of the disclosure.

FIG. 13 is a cut-away schematic side-view of a plug member 1000 according to an alternative embodiment of the disclosure. It is within the scope of this disclosure that the plug member 1000 illustrated in FIG. 13 may be used in place of the plug member 606 illustrated in FIGS. 5-10. As a result, it is within the scope of this disclosure that the plug member 1000 has an outer diameter OD7 that is substantially equal to, slightly less than or slightly greater than the diameter D2 or D6 of the second receiving portion 604 or 874 of the constant velocity joint assembly 500 of 800. According to an embodiment of the disclosure and as a non-limiting example, the plug member 1000 may be press-fit into the second receiving portion 604 or 874 of the constant velocity joint assembly 500 or 800. In accordance with an alternative embodiment of the disclosure and as a non-limiting example, the plug member 1000 may be secured within the second receiving portion 604 or 874 of the outer race 506 or 804 by using one or more welds, such as but not limited to one or more tack welds. The plug member 1000 aids in preventing the migration of one or more lubrication fluids (not shown) from outside the constant velocity joint assembly 500 or 800 thereby ensuring the joint 500 or 800 has proper lubrication when in operation.

According to the embodiment of the disclosure illustrated in FIG. 13, the plug member 1000 further includes a first substantially horizontal portion 1002, a second substantially horizontal portion 1004 and a radially inward extending portion 1006 connecting the first substantially horizontal portion 1002 to the second substantially horizontal portion 1004. As illustrated in FIG. 13 of the disclosure, the radially inward extending portion 1006 of the plug member 1000 includes an axially extending portion 1008. In accordance with the embodiment of the disclosure illustrated in FIG. 13, the axially extending portion 1008 of the plug member 1000 extends axially outboard away from the radially inward extending portion 1006 of the plug member 1000. The axially extending portion 1008 may be of a size and shape needed to receive at least a portion of the first shaft 501, the inner race 504 or 802, the cage 508 or 806, one or more of the one or more torque transfer elements 510 or 818 and/or the one or more crash collapse features 700. As a result, it is to be understood that the axially extending portion 1008 of the plug member 1000 extends the amount of distance the first shaft 502, the inner race 504 or 802, the cage 508 or 806 and/or the one or more torque transfer elements 510 or 808 can travel axially before the plug member 1000 is forced out of engagement with the second receiving portion 604 or 874 of the outer race 506 or 804 during a crash condition.

In accordance with an embodiment of the disclosure and as a non-limiting example, the axially extending portion 1008 of the plug member 1000 may have a length L5. It is within the scope of this disclosure and as a non-limiting example that the length L5 of the axially extending portion 1008 of the plug member 1000 may be substantially equal to or greater than the amount of distance the first shaft 501, the inner race 504 or 802, the cage 508 or 806, one or more of the one or more torque transfer elements 510 or 818 and/or the one or more crash collapse features 700 may translate upon the occurrence of a crash condition. As a result, it is to be understood that the axially extending portion 1008 of the plug member 1000 may provide the constant velocity joint assembly 500 or 800 with the ability to prevent the one or more lubrication fluids (not shown) within the constant velocity joint assembly 500 or 800 from entering into the second shaft 594 after the occurrence of a crash condition. Additionally, it is to be understood that the axially extending portion 1008 of the plug member 1000 will aid in preventing the first shaft 502, the inner race 504 or 802, the cage 508 or 806 and/or the one or more torque transfer elements 510 or 808 from translating axially beyond a pre-determined amount within the second shaft 594. This aids in preventing the first shaft 502, the inner race 504 or 802, the cage 508 or 806 and/or the one or more torque transfer elements 510 or 808 from causing unnecessary damage to the second shaft 594 and/or the components (not shown) of the drive-line attached to the opposite end of the second shaft 594.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed:

1. A constant velocity joint assembly, comprising:
an inner race, an outer race, a cage, one or more torque transfer elements, a flexible boot, and a boot can;

wherein said inner race is drivingly connected to a first shaft;

wherein said outer race is drivingly connected to a second shaft;

wherein said outer race has an inner surface and an outer surface defining a hollow portion therein;

wherein one or more outer race torque transfer element grooves circumferentially extend along at least a portion of said inner surface of said outer race;

wherein upon the occurrence of a crash condition said cage of said constant velocity joint assembly is driven into direct contact with one or more crash collapse features and said cage applies an amount of force onto said one or more crash collapse features needed to separate said one or more crash collapse features from said outer race allowing at least a portion of said first shaft to translate axially into at least a portion of said second shaft;

wherein at least a portion of a first end portion of said boot can is connected to said outer race of said constant velocity joint assembly and at least a portion of a second end portion of said boot can is connected to at least a portion of a first end portion of said flexible boot;

wherein at least a portion of a second end portion of said flexible boot is connected to at least a portion of said first shaft;

wherein an amount of force needed to translate said first shaft into said second shaft is dependent on an ultimate tensile strength of said flexible boot, an amount of clamping force exerted onto said flexible boot by said second end portion of said boot can and an amount of force needed separate said one or more crash collapse features from said outer race of said constant velocity joint assemblies; and wherein said one or more crash collapse features comprises a substantially cylindrical portion.

2. The joint assembly of claim 1, wherein said substantially cylindrical portion of said one or more crash collapse features have a length of approximately 1 mm to approximately 25 mm.

3. The joint assembly of claim 1, wherein said one or more crash collapse features have a ratio of an outermost diameter of said cage/a diameter of said substantially cylindrical portion of said one or more crash collapse features is from approximately 1.0002 to approximately 1.5.

4. The joint assembly of claim 1, wherein said one or more crash collapse features have a ratio of a length of said substantially cylindrical portion/a diameter of said substantially cylindrical portion of said one or more crash collapse features is from approximately 0.002 to approximately 0.5.

* * * * *